(12) United States Patent
Karjalainen et al.

(10) Patent No.: US 12,010,660 B2
(45) Date of Patent: Jun. 11, 2024

(54) IMPROVING OPERATION OF BEAM-BASED WIRELESS COMMUNICATION NETWORKS

(71) Applicant: Nokia Technologies Oy, Espoo (FI)

(72) Inventors: Juha Pekka Karjalainen, Oulu (FI); Timo Koskela, Oulu (FI); Sami-Jukka Hakola, Kempele (FI); Jorma Johannes Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 406 days.

(21) Appl. No.: 17/312,584

(22) PCT Filed: Dec. 31, 2018

(86) PCT No.: PCT/EP2018/086907
§ 371 (c)(1),
(2) Date: Jun. 10, 2021

(87) PCT Pub. No.: WO2020/141014
PCT Pub. Date: Jul. 9, 2020

(65) Prior Publication Data
US 2021/0329611 A1    Oct. 21, 2021

(51) Int. Cl.
*H04L 5/00*        (2006.01)
*H04W 48/12*   (2009.01)
(Continued)

(52) U.S. Cl.
CPC ......... *H04W 72/044* (2013.01); *H04L 5/0053* (2013.01); *H04W 48/12* (2013.01); *H04W 52/0216* (2013.01); *H04W 84/12* (2013.01)

(58) Field of Classification Search
CPC ...... H04L 5/003; H04L 5/0053; H04W 16/24; H04W 16/28; H04W 36/085;
(Continued)

(56) References Cited

U.S. PATENT DOCUMENTS

2018/0227887 A1    8/2018    Hakola et al.
2019/0097874 A1*  3/2019    Zhou ..................... H04L 5/0023
2019/0394793 A1* 12/2019    Venugopal ............ H04L 1/1614

FOREIGN PATENT DOCUMENTS

WO    2018/129319 A1    7/2018

OTHER PUBLICATIONS

"3rd Generation Partnership Project; Technical Specification Group Radio Access Network; NR; Medium Access Control (MAC) protocol specification (Release 15)", 3GPP TS 38.321, V15.3.0, Sep. 2018, pp. 1-76.
(Continued)

*Primary Examiner* — Matthew W Genack
(74) *Attorney, Agent, or Firm* — Lippes Mathias LLP

(57) ABSTRACT

According to an example aspect of the present invention, there is provided a method comprising transmitting a first configuration of time domain behaviour for monitoring at least one first downlink control channel using at least one first downlink beam of a beamformed transmission, determining that there is a need for changing from the at least one first downlink beam to at least one second downlink beam and transmitting a first command to configure a receiver for monitoring the at least one first downlink control channel associated with the at least one second downlink beam according to a second configuration of time domain behaviour.

23 Claims, 12 Drawing Sheets

(51) Int. Cl.
    *H04W 52/02*     (2009.01)
    *H04W 72/044*     (2023.01)
    *H04W 84/12*     (2009.01)

(58) Field of Classification Search
    CPC . H04W 48/08; H04W 48/12; H04W 52/0209; H04W 52/0216; H04W 72/04; H04W 72/044; H04W 72/046; H04W 72/20; H04W 84/10; H04W 84/12
    See application file for complete search history.

(56) References Cited

OTHER PUBLICATIONS

"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.

"3rd Generation Partnership Project; Technical Specification Group Radio Access Network; NR; Physical layer procedures for data (Release 15)", 3GPP TS 38.214, V15.3.0, Sep. 2018, pp. 1-96.

"3rd Generation Partnership Project; Technical Specification Group Radio Access Network; NR; Physical channels and modulation (Release 15)", 3GPP TS 38.211, V15.3.0, Sep. 2018, pp. 1-96.

"3rd Generation Partnership Project; Technical Specification Group Radio Access Network; NR; Multiplexing and channel coding (Release 15)", 3GPP TS 38.212, V15.3.0, Sep. 2018, pp. 1-99.

"3rd Generation Partnership Project; Technical Specification Group Radio Access Network; NR; Physical layer procedures for control (Release 15)", 3GPP TS 38.213, V15.3.0, Sep. 2018, pp. 1-101.

International Search Report and Written Opinion received for corresponding Patent Cooperation Treaty Application No. PCT/EP2018/086907, dated Aug. 9, 2019, 14 pages.

"Control Channel Multi-Beam Operation", 3GPP TSG RAN WG1 #90, R1-1713420, Agenda : 6.1.3.1.2.3, Qualcomm Incorporated, Aug. 21-25, 2017, 6 pages.

* cited by examiner

```
TCI-State ::=    SEQUENCE{
    tci-StateId  TCI-StateId,
    qcl-Type1    QCL-Info,
    qcl-Type2    QCL-InfoOPTIONAL,--Need    R
    SearchSpace                  {Slot-periodicity, Slot-Offset},
OPTIONAL (defined only for DRX mode),
DRX-SlotOffset SlotOffset, OPTIONAL (defined only
for DRX mode),
...
}

QCL-Info ::= SEQUENCE{
    cell ServCellIndexOPTIONAL,--Need R
    bwp-Id BWP-Id OPTIONAL, --Cond
CSI-RS-Indicated
    referenceSignal CHOICE{
    csi-rs NZP-CSI-RS-ResourceId,
    ssb SSB-Index
    },
    qcl-Type ENUMERATED{typeA, typeB, typeC,
typeD},
...
}
```

FIGURE 6

IMPROVING OPERATION OF BEAM-BASED WIRELESS COMMUNICATION NETWORKS

RELATED APPLICATION

This application claims priority to PCT Application No. PCT/EP2018/086907, filed on Dec. 31, 2018, each of which is incorporated herein by reference in its entirety.

FIELD

Various example embodiments relate in general to beam-based wireless communication networks, and improving operation of such networks.

BACKGROUND

Wireless communication networks typically have limited resources. Hence, efficient operation is important for various networks, such as, for cellular networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR.

In general, the purpose of the 3GPP is to improve operation of wireless communication networks. More specifically, improving efficiency of wireless communication networks that use beamformed transmissions is a hot topic nowadays in the 3GPP discussions. There is therefore a need to provide improved methods, apparatuses and computer programs for improving operation of beam-based wireless communication networks. Similar improvements may also be useful in several other wireless communication networks as well, such as, for example, in Wireless Local Area Networks, WLANs.

SUMMARY

According to some aspects, there is provided the subject-matter of the independent claims. Some embodiments are defined in the dependent claims.

According to a first aspect, there is provided a first method comprising transmitting a first configuration of time domain behaviour for monitoring at least one first downlink control channel using at least one first downlink beam of a beamformed transmission, determining that there is a need for changing from the at least one first downlink beam to at least one second downlink beam and transmitting a first command to configure a receiver for monitoring the at least one first downlink control channel associated with the at least one second downlink beam according to a second configuration of time domain behaviour.

According to the first aspect, the second configuration of time domain behaviour may be an adjustment of the first configuration of time domain behaviour.

According to the first aspect, the first configuration of time domain behaviour may be associated with a first TCI state and the second configuration of time domain behaviour may be associated with a second TCI state.

According to the first aspect, the first method may further comprise transmitting the first configuration of time domain behaviour using Radio Resource Control, RRC, signaling and transmitting the first command comprises using Media Access Control, MAC, signaling or Layer 1, L1, signaling.

According to the first aspect, the first method may further comprise transmitting a first control message using the at least one first downlink control channel according to the second configuration of time domain behaviour.

According to the first aspect, the first configuration of time domain behaviour may comprise a first starting time and/or duration and/or periodicity for monitoring the at least one first downlink control channel and the second configuration of time domain behaviour may comprise a second starting time and/or duration/or periodicity for monitoring the at least one first downlink control channel.

According to the first aspect, the first method may further comprise the first configuration of time domain behaviour may comprise information related to a first Discontinuous Reception, DRX, configuration and the second configuration of time domain behaviour may comprise information related to a second DRX configuration.

According to the first aspect, the first configuration may comprise first downlink control channel search space parameters and the second configuration may comprise second downlink control channel search space parameters.

According to the first aspect, the first and the second configurations of time domain behaviour may be associated with a control resource set.

According to the first aspect, the first and the second configurations of time domain behaviour may be associated with a downlink reference signal, such as a SS/PBCH block and/or NZP-CSI-RS.

According to the first aspect, the first method may further comprise transmitting a second command for activating the second configuration of time domain behaviour for monitoring the at least one first downlink control channel associated with the at least one second downlink beam.

According to the first aspect, the first and the second commands are separate commands or a single command.

According to a second aspect, there is provided a second method comprising configuring a receiver for monitoring at least one first downlink control channel associated with at least one first downlink beam of a beamformed transmission according to a first configuration of time domain behaviour, receiving a first command for changing from the at least one first downlink beam to at least one second downlink beam and configuring, in response to receiving the first command, the receiver for monitoring the at least one first downlink control channel associated with the at least one second downlink beam according to a second configuration of time domain behaviour.

According to the second aspect, the second configuration of time domain behaviour is an adjustment of the first configuration of time domain behaviour.

According to the second aspect, the first configuration of time domain behaviour is associated with a first TCI state and the second configuration of time domain behaviour is associated with a second TCI state.

According to the second aspect, the second method may further comprise receiving the first configuration of time domain behaviour using RRC signaling and receiving the first command using MAC signalling or Layer 1, L1, signaling.

According to the second aspect, the second method may further comprise receiving a first control message using the at least one first downlink control channel according to the second configuration of time domain behaviour.

According to the second aspect, the first configuration of time domain behaviour may comprise a first starting time and/or duration and/or periodicity for monitoring the at least one first downlink control channel and the second configuration of time domain behaviour may comprise a second starting time and/or duration and/or periodicity for monitoring the at least first one downlink control channel.

According to the second aspect, the first configuration of time domain behaviour may comprise information related to a first DRX configuration and the second configuration of time domain behaviour may comprise information related to a second DRX configuration.

According to the second aspect, the first configuration may comprise first downlink control channel search space parameters and the second configuration may comprise second downlink control channel search space parameters.

According to the second aspect, the first and the second configurations of time domain behaviour may be associated with a control resource set.

According to the second aspect, the first and the second configurations of time domain behaviour may be associated with a downlink reference signal, such as a SS/PBCH block and/or NZP-CSI-RS.

According to the second aspect, the second method may further comprise receiving a second command for activating the second configuration of time domain behaviour for monitoring the at least one first downlink control channel associated with the at least one second downlink beam.

According to the second aspect, the first and the second commands may be separate commands or a single command.

According to a third aspect of the present invention, there is provided an apparatus comprising at least one processing core, at least one memory including computer program code, the at least one memory and the computer program code being configured to, with the at least one processing core, cause the apparatus at least to perform the first method.

According to a fourth aspect of the present invention, there is provided an apparatus comprising at least one processing core, at least one memory including computer program code, the at least one memory and the computer program code being configured to, with the at least one processing core, cause the apparatus at least to perform the second method.

According to a fifth aspect of the present invention, there is provided an apparatus comprising means for performing the first method. According to a sixth aspect of the present invention, there is provided an apparatus comprising means for performing the second method.

According to a seventh aspect of the present invention, there is provided non-transitory computer readable medium having stored thereon a set of computer readable instructions that, when executed by at least one processor, cause an apparatus to at least perform the first method. According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

BRIEF DESCRIPTION OF THE DRAWINGS

FIG. 6 illustrates an example of a definition of a TCI state in accordance with at least some embodiments.

EMBODIMENTS

Operation of beam-based wireless communication networks may be improved by the procedures described herein. More specifically, power consumption of wireless terminals may be reduced while enabling scheduling flexibility in such networks.

In a beam-based wireless communication network, a wireless network node, such as a Base Station, BS, may not be able to transmit downlink control channels simultaneously over different spatial directions, i.e., over different beams. Thus, scheduling restrictions would be imposed. Scheduling restrictions may be taken into account by extending the time during which a wireless terminal, such as a User Equipment, UE, may monitor a downlink control channel.

However, extending the time during which the UE may monitor the downlink control channel would lead to increasing power consumption of the UE. The spatial direction, i.e., a beam, of a downlink control channel scheduled for the UE may be indicated by the BS using a Transmission Configuration Indication, TCI, state. In some embodiments, M TCI states may be assigned to the UE, by the BS, using Radio Resource Control, RRC, signaling. Each of the M TCI states may correspond to a reference signal that shares the same spatial direction as one downlink control channel scheduled for the UE. That is to say, each TCI state may have one reference signal to provide spatial domain parameter, i.e. to characterize a transmit beam of the BS.

Media Access Control, MAC, signaling is typically faster than RRC signaling and hence, MAC signaling may be used by the BS to dynamically indicate one configuration, i.e., one TCI state of the M TCI states, to the UE to be used for monitoring the downlink control channel. The configuration for monitoring the downlink control channel may be adapted to avoid unnecessary monitoring. The configuration may also comprise a Discontinuous Reception, DRX, configuration and it may be associated with a downlink beam. In some embodiments, the configuration may be adapted to the current Downlink Transmission, DL TX, spatial direction. For example, the configuration may be adapted as the UE moves under different beams.

Therefore, different configurations for monitoring downlink control channels may be associated with different downlink beams. For instance, different DRX parameters may be associated with different TCI states, e.g., by associating different OnDurations with different TCI states. Operation of the beam-based wireless communication network is therefore improved because scheduling restrictions may be avoided. Power consumption of UEs may be reduced as well. Moreover, adaptation of the configuration may be performed using MAC signaling, instead of RRC signaling, to enable dynamic and efficient adaptation.

Figure 1:
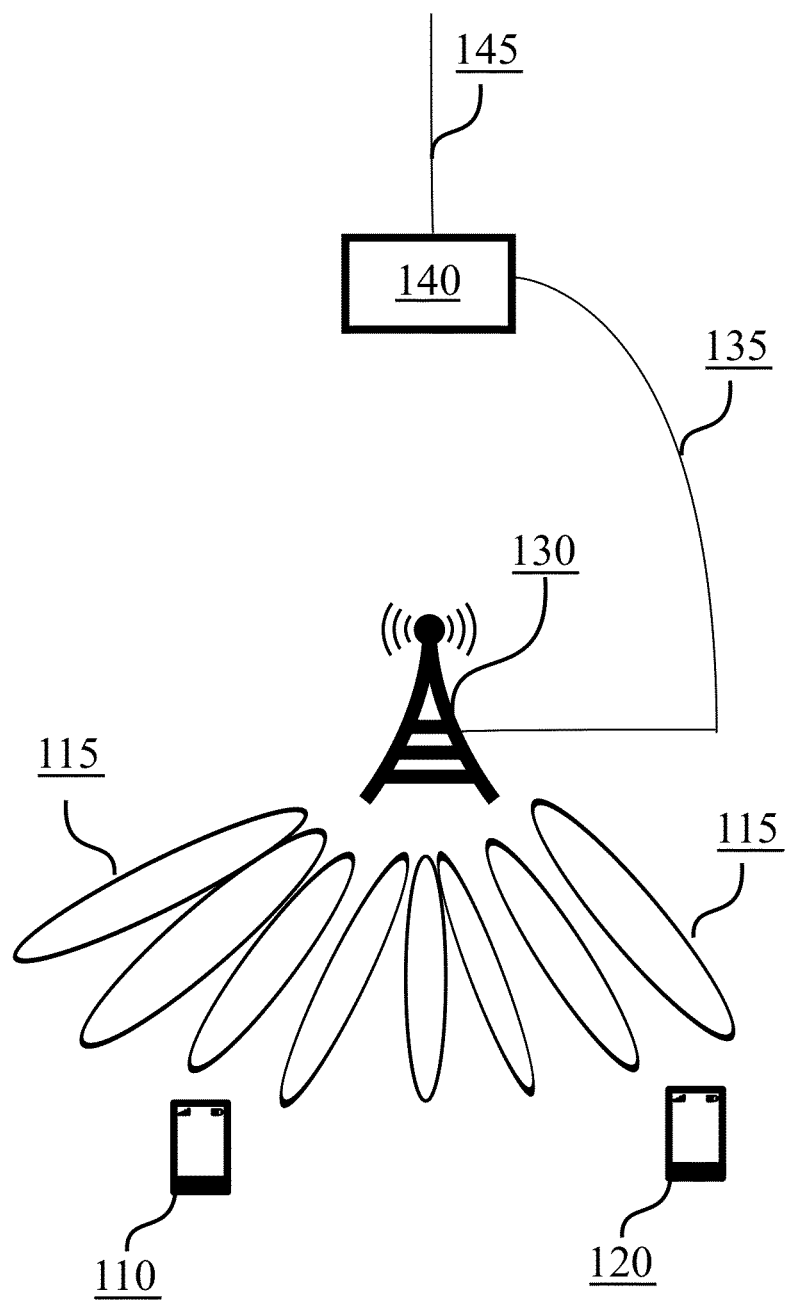
FIG. 1 illustrates an exemplary network scenario in accordance with at least some embodiments.

FIG. 1 illustrates an exemplary network scenario in accordance with at least some embodiments. According to the example scenario of FIG. 1, there may be a beam-based wireless communication system, which comprises first UE 110, second UE 120, BS 130, and core network element 140. UEs 110 and 120 may be connected to BS 130 via air interface using beams 115.

UEs 110 and 120 may comprise, for example, a smartphone, a cellular phone, a Machine-to-Machine, M2M, node, Machine-Type Communications node, MTC, an Internet of Things, IoT, node, a car telemetry unit, a laptop computer, a tablet computer or, indeed, another kind of suitable wireless terminal or mobile station. In some embodiments, UE 110 and/or UE 120 may be equipped with multiple antenna panels. Multiple antenna panels may be used for transmission/reception and each panel may comprise multiple antenna elements.

In the example system of FIG. 1, UEs 110 and 120 may communicate wirelessly with a cell of BS 130 via beams 115. Beams 115 may be referred to as DL TX beams, transmitted by BS 130. BS 130 may be considered as a serving BS for UEs 110 and 120. Air interface between UEs 110, 120 and BS 130 may be configured in accordance with a Radio Access Technology, RAT, which UEs 110, 120 and BS 130 are configured to support.

Examples of cellular RATs include Long Term Evolution, LTE, New Radio, NR, which may also be known as fifth generation, 5G, radio access technology and MulteFire. On the other hand, examples of non-cellular RATs include Wireless Local Area Network, WLAN, and Worldwide Interoperability for Microwave Access, WiMAX. For example, in the context of LTE, BS 130 may be referred to as eNB while in the context of NR, BS 130 may be referred to as gNB.

Also, for example in the context of WLAN, BS 130 may be referred to as an access point. In general, BS 130 may be referred to as a wireless network node. UEs 110 and 120 may be similarly referred to as wireless terminals or mobile stations in general. In any case, embodiments are not restricted to any particular wireless technology. Instead, embodiments may be exploited in any system which uses beamforming for wireless transmissions.

BS 130 may be connected, directly or via at least one intermediate node, with core network 140 via interface 135. Core network 140 may be, in turn, coupled via interface 145 with another network (not shown in FIG. 1), via which connectivity to further networks may be obtained, for example via a worldwide interconnection network. BS 130 may be connected with at least one other BS as well via an inter-base station interface (not shown in FIG. 1), even though in some embodiments the inter-base station interface may be absent. BS 130 may be connected, directly or via at least one intermediate node, with core network 140 or with another core network.

Nowadays at least some traffic, if not all, going through a communication network may be sporadic by nature. For example one transmission of Internet Protocol, IP, based packet data traffic may need to be transmitted and received in a short time duration, but the time between consecutive transmissions may be relatively long. That is to say, transmissions may be bursty while there are no transmissions between two subsequent bursts. A UE may be in a sleep mode, e.g., turn off the radio, between two subsequent bursts to save power. Hence, a UE may be in a sleep mode for most of the time, thereby enabling savings in power consumption.

As an example, in LTE power consumption of UEs may be reduced by exploiting DRX. If the UE is in the idle mode, the UE may stay in a sleeping mode defined by a DRX cycle, which may be provided in System Information Block 2, SIB2, transmitted by a BS. According to the provided DRX cycle, the UE may periodically wake-up for a monitoring occasion, to monitor a downlink control channel, e.g., Physical Downlink Control Channel, PDCCH, and check for presence of paging information. The paging information may be scrambled with Paging-Radio Network Temporary Identifier, P-RNTI, according the DRX cycle.

If the downlink control channel, e.g., PDCCH, indicates paging information, the UE may need to demodulate a downlink shared channel, e.g., Physical Downlink Shared Channel, PDSCH, resources indicated by the downlink control channel. However, if the downlink control channel does not comprise an indication about paging information, the UE may go to the sleep mode to save power. As an example, a sub-frame time index where the paging information, e.g., P-RNTI, may be transmitted on the downlink control channel, such as, PDCCH, may be referred as a paging occasion.

A BS may also configure a UE for a sleep mode, even if the UE is in a connected mode, by using a Connected mode DRX, C-DRX. If the UE is configured with C-DRX, the UE may periodically monitor the downlink control channel, e.g., PDCCH, in connected mode according to the configured C-DRX cycle for a potential downlink shared channel, e.g., PDSCH, scheduling grant. Consequently, the UE may wake-up when there is data available for the UE. In this case, the time reserved for monitoring the downlink channel for the downlink or uplink shared channel scheduling grant and for demodulating the downlink shared channel, transmitting the uplink control channel or transmitting the uplink shared channel may be referred to as OnDuration.

LTE may also support different groups of UEs, which monitor different time instants for their paging messages. Depending on monitoring periodicity of the downlink control channel, e.g., PDCCH, power consumption of UEs may be controlled by a BS. Hence, different groups of UEs may be configured for different power saving modes, i.e, power consumption of different UEs may be different.

DRX functionality may be exploited for saving power of the UE in the context of NR as well. If the UE is in a DRX mode, it may monitor a downlink control channel, e.g. PDCCH, periodically to find out whether there is data available for it or not. In NR, a network may be able to configure long and short DRX cycles for UEs. As an example, if a DRX cycle is configured, active time may include the time where drx-onDurationTimer or drx-InactivityTimer or drx-RetransmissionTimerDL or drx-RetransmissionTimerUL or ra-ContentionResolutionTimer is running; or a Scheduling Request, SR, is sent on Physical Uplink Control Channel, PUCCH, and is pending; or a PDCCH indicating a new transmission addressed to a Cell-Radio Network Temporary Identifier, C-RNTI, of the MAC entity has not been received after successful reception of a random access response for a random access preamble not selected by the MAC entity among contention-based random access preambles.

Moreover, a wake-up signal may be used to further enhance power saving of a device in addition to DRX. For example, a specific preamble signal, i.e., a wake-up signal, may be suitable for devices operating according to LTE, NR or Institute of Electrical and Electronics Engineers, IEEE 802.11ba standard, to indicate about availability of data. A UE may have a specific receiver for detection of wake-up signals. The receiver may be as simple and low-power as possible to enable enhanced power savings. In some embodiments, the wake-up signal may be referred to as an activity preamble as well.

In the context of NR wake-up signals may exploited at least for wireless devices supporting even Further Enhanced Machine Type Communication, eFEMTC, and eFE-NB-IoT. In general, in cellular networks wake-up signals may be used to reduce power consumption of the UE caused by the need to monitor a downlink control channel, e.g., PDCCH. Periodic monitoring of a downlink control channel would lead to a shortened battery life of the UE in idle mode, because monitoring of a downlink control channel requires Fast Fourier Transform, FFT, computation, channel estimation, blind decoding of downlink control channel candidates for each configured search space as well as related decoding of channel coding. Power consumption in connected mode may be reduced for the same reasons similarly using wake-up signals.

Unnecessary monitoring of the downlink control channel may be avoided by using wake-up signals, which may indicate to the UE whether it needs to monitor the downlink control channel, or not, for example for paging in idle mode or for a scheduling grant in connected mode. As the UE may use a simple and low-power receiver for monitoring wake-up signals, monitoring of wake-up signals does not consume as much power as monitoring of the downlink control channel, thereby enabling further power savings.

Figure 2:
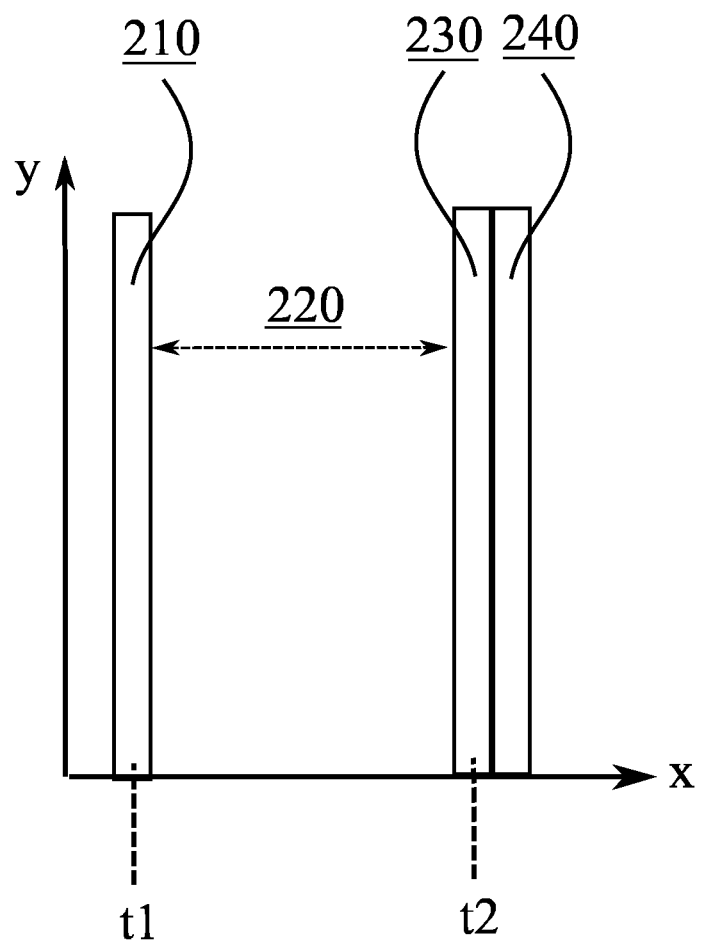
FIG. 2 illustrates an example of the use of a wake-up signal in accordance with at least some embodiments.

FIG. 2 illustrates an example of the use of a wake-up signal in accordance with at least some embodiments. The example of FIG. 2 may be applicable at least for UEs 110 and 120 in idle mode. However, in some embodiments UEs may be in connected mode as well and thus embodiments are not limited to UEs in idle mode.

In FIG. 2, time is represented on the x-axis while frequency, or bandwidth, is represented on the y-axis. Wake-up signal is denoted by 210, downlink control channel, e.g., PDCCH, is denoted by 230 and a downlink shared channel, e.g., PDSCH, is denoted by 240. Time instant t1 refers to the transmission time of wake-up signal 210 while time instant t2 refers to the transmission time of downlink control channel 230. Delay 220 refers to the delay between wake-up signal 210 and downlink control channel 230, i.e., the difference between time instants t1 and t2.

Downlink shared channel 240 may be associated with downlink control channel 230. In other words, downlink control channel 230 may comprise an indicator to downlink shared channel 240, for indicating to a UE, by the BS, a resource allocated for the UE on downlink shared channel 240.

According to the example of FIG. 2, wake-up signal 210 may be placed prior to downlink control channel 230 in time, possibly with a timing offset, e.g., delay 220. The timing offset may be configured by a BS or a network in general. Wake-up signal 210 may have specific monitoring parameters, such as, for example, periodicity, offset and pattern. To enable maximum battery life of the UE, a specific detector, i.e. receiver, may be implemented for reception of wake-up signals. Such a detector may be as simple as possible, e.g., a correlator bank.

In the example of FIG. 2 wake-up signal 210 may be used together with DRX to indicate whether a UE needs to decode, or not, downlink control channel 230 for idle mode paging or connected mode operation. Single wake-up signal 210 may be used to inform the UE whether to monitor a paging occasion of downlink control channel 230 or occasion of downlink control channel 230 in connected mode. In addition, wake-up signal 210 may be used together with synchronization signals, to enable time and frequency tracking when long DRX cycles are used, e.g., in case of enhanced Machine Type Communications, eMTC.

Various signals may be used as wake-up signals. For example, in the context of cellular networks, the following signals may be considered as wake-up signals:

Demodulation Reference Signal, DMRS, of PDCCH;
DMRS of Physical Broadcast Channel, PBCH;
Channel State Information-Reference Signal, CSI-RS, for frequency and time tracking, TRS;
Physical Downlink Control Channel, PDCCH;
CSI-RS for beam management.

A UE may obtain time and frequency synchronisation to a cell and identity of the cell by detecting a Synchronization Signal Block, SSB. Moreover, SSB may comprise a Primary Synchronisation Signal, PSS, Secondary Synchronisation Signal, SSS, and PBCH together with DMRS associated with PBCH. Identity of the cell may be carried by PSS and SSS via sequence initialization. In addition, PBCH may carry a Master Information Block, MIB, DMRS, SSB index/SSB time location index, and other information.

In some embodiments, SSBs with different indices may be transmitted to different spatial directions in time multiplexed manner using one beam at a time, to provide coverage for a cell area using multiple narrow beams when a single, narrow beam is not able to cover the whole cell area in spatial domain. Thus, a beam of a beamformed transmission may correspond to a certain spatial direction. Beamformed transmission may comprise multiple beams, wherein each beam is transmitted to a different direction. The beam of a beamformed transmission may also be referred to as a beamforming beam.

Figure 3:
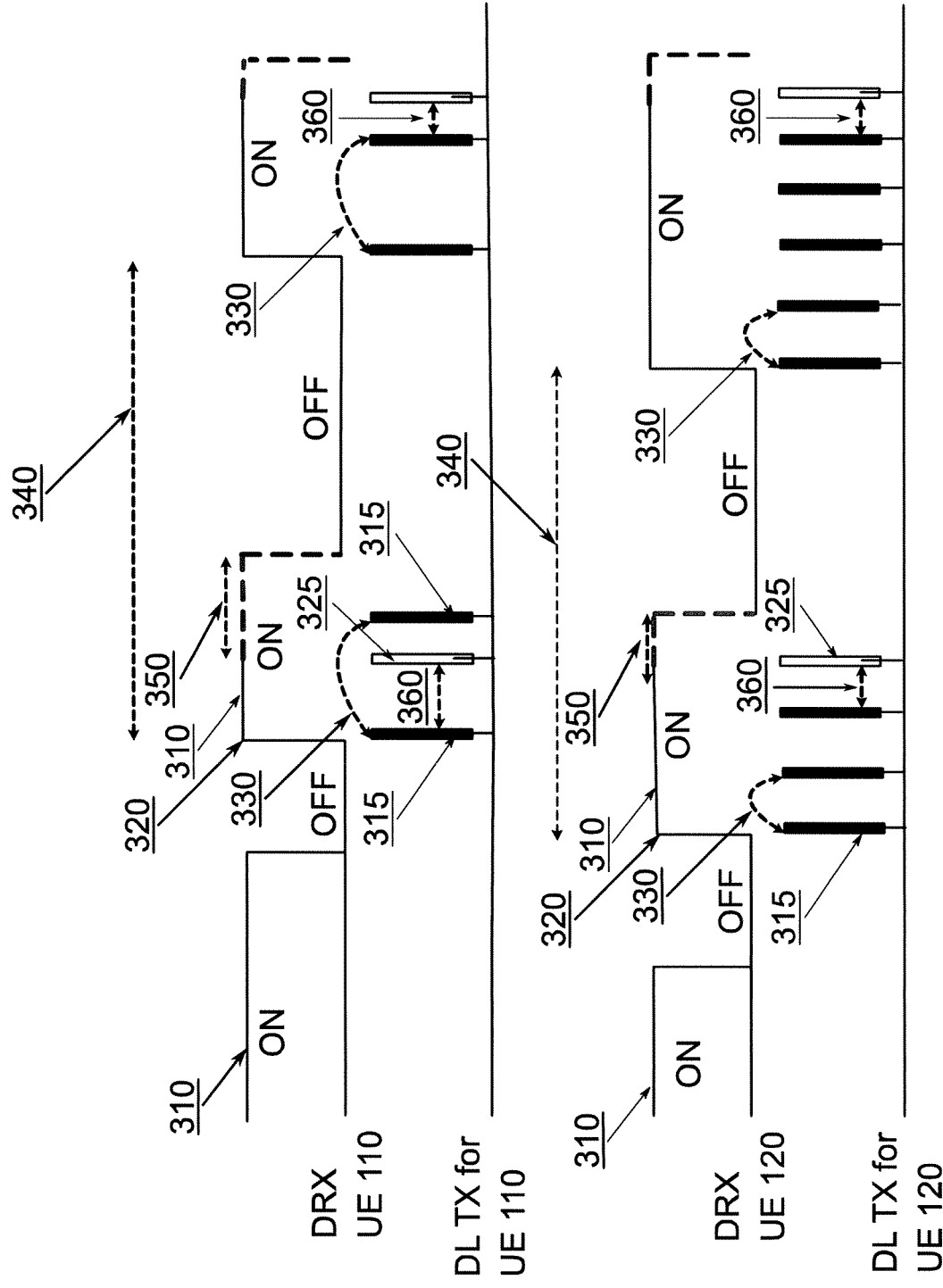
FIG. 3 illustrates an example of DRX operation using a downlink control channel as a wake-up signal in accordance with at least some embodiments.

FIG. 3 illustrates an example operation using a downlink control channel, such as a PDCCH, as a wake-up signal in accordance with at least some embodiments. In FIG. 3, DRX operation for first UE 110 and second UE 120 is demonstrated together with cross-slot scheduling. First UE 110 and second UE 120 may be in connected mode during the operation. FIG. 3 may represent C-DRX operation, wherein PDCCH may be used as a wake-up signal with omni-type of transmission and reception.

Cross-slot scheduling is a feature that may be used to provide power saving for UEs by configuring RRC-signaling associated with all candidate values of K0, wherein K0 defines scheduling latency between the downlink control channel, which may comprise a DL assignment, and a downlink shared channel, such as PDSCH, to be larger than 0 in terms of slots. Otherwise micro-sleep would not be allowed. As K0 is larger than 0, the DL assignment and scheduled DL data transmission on the downlink shared channel would be allocated into different slots. The actual, selected value of K0 may be signalled via a Downlink Control Indicator, DCI, using the downlink control channel.

As a result of this, power savings may be obtained by allowing UEs 110 and 120 to enter into a micro-sleep without data buffering and additional signal processing between time instants associated with the DL assignment and DL data transmission. Even though power saving gains can be obtained for DL data transmission, when K0>0, cross-slot scheduling does still require monitoring of the downlink control channel. Regarding monitoring of the downlink control channel, monitoring parameters may be adapted by RRC-signaling to enable power savings for UEs 110 and 120, e.g., by reducing the number of blind decoding candidates per possible downlink control channel occasion and downlink control channel occasions with lower periodicity.

In FIG. 3, active time (OnDuration) is denoted by 310, DRX slotOffset with regards to System Frame Number, SFN, is denoted by 320, search space periodicity and offset is denoted by 330, C-DRX cycle, i.e., DRC config for wake-up signal is denoted by 340, Inactivity timer is denoted by 350 and K0 scheduling delay between a downlink control channel and a downlink shared channel is denoted by 360. Moreover, a transmission on a downlink control channel is denoted by 315 (black rectangles) while a transmission on a downlink shared channel is denoted by 325 (white rectangles). Downlink control channel transmission 315 may comprise a wake-up signal.

During DRX cycle with OnDuration, UEs 110 and 120 may monitor a downlink channel for a DL TX. The UE may aim to blindly decode candidate downlink control channels, such as PDCCHs, transmitted from BS 130 using search spaces associated with control resource sets, such as CORE-SETs, to determine whether a DL assignment or an UL scheduling grant would be available on downlink shared channel 325.

In some embodiments, DRX parameters may be defined in accordance with 3GPP TS 38.331 and TS 38.321 standard specifications. For example, TS 38.331 and TS 38.321 standards may define, e.g., the time duration of OnDuration 310, DRX slot offset with respect to SFN 320, DRX cycle length in time 340 and inactivity timer 350. Said DRX parameters may be controlled by BS 130 using RRC-signaling.

In some embodiments, downlink control channel parameters, e.g. PDCCH parameters, may be defined in accordance with 3GPP TS 38.331 and TS 38.321 standard specifications as well. Downlink control channel parameters may comprise, for example, search space and monitoring periodicity 330. Said downlink control channel parameters may also be controlled by BS 130 using RRC-signaling.

In some embodiments, DRX and downlink control channel parameters may be controlled independently. That is to say, there may, or may not, be a linkage between the DRX and downlink control channel parameters. When operating with non-beam based DL/UL transmission and reception, i.e., omni-type of transmission/reception, certain issues related to UE power saving and network scheduling flexibility may not arise, however, certain issues may arise if a wireless communication network operates with beam-based DL/UL transmission and reception, e.g., on Frequency Range 1, FR1, or Frequency Range 2, FR2. FR1 may comprise frequencies below 6 GHz while FR2 may comprise frequencies above 6 GHz, such as frequencies between 24 and 52.6 GHz. Nevertheless, in general embodiments are suitable for any beam-based wireless communication system operating on frequencies up to THz frequency bands, while including frequencies below 6 GHz.

In some embodiments, wake-up signals and go-to-sleep signals may be considered for saving power of UEs 110 and 120. Downlink control channel may be used as a trigger for UEs 110 and 120 for downlink control channel based wake-up signal triggering, to indicate whether UEs 110 and 120 need to monitor a downlink control channel for a DL assignment or an UL scheduling grant, or not. For instance, if there is no indication for UE 110, UE 110 may enter back into a sleep mode. Similar to wake-up signaling, downlink control channel or Reference Signal, RS, based indication may be used as a triggering signal for go-to-sleep signals signal to enable UE 110 to go back to the sleep mode.

In some embodiments, go-to-sleep signals may be seen similar as a DRX MAC Control Element, CE, command, i.e., stop drx-OnDurationTimer and drx-InactivityTimer, e.g., in accordance with 3GPP Rel-15 standard specifications. However, said DRX MAC CE command enables reduced dynamic behaviour in time with respect to physical layer signaling, such as downlink control channel or RS. In comparison with cross-slot scheduling, wake-up and go-to-sleep mechanisms may be exploited to obtain power savings by reducing downlink shared channel and downlink control channel measurements and reporting, as well as CSI measurements and reporting (except for measurements that are dedicated for Radio Resource Management, RRM). In any case, a dynamic adaptation of DRX configuration may be beneficial for saving power of UEs 110 and 120.

In general, beam management may comprise different functionalities, such as beam indication, beam measurements and reporting, beam recovery and beam tracking and refinement. Beam indication may be used to assist UEs 110 and 120 to set transmitting and receiving beams properly, for receiving DL transmission and transmitting UL transmissions, respectively.

Beam measurements and reporting may comprise procedures for providing to BS 130 knowledge about feasible DL and UL beams for UEs 110 and 120. For example, a downlink reference signal, such as a SS/PBCH block and/or NZP-CSI-RS, may be used for sounding beams transmitted by BS 130. UEs 110 and 120 may measure and provide Reference Signal Received Power, RSRP, measurements on DL RSs.

For example, it may be possible to determine feasible beams for DL and UL based on DL measurements by assuming that transmit and receive beams correspond to each other. It may also be possible to configure a UE, e.g., UEs 110, with at least one UL Sounding Reference Signal, SRS, resource to separately find UL beams where UE 110 transmits SRS using different TX beams. BS 130 may measure the UL beams and based on the measurements, BS 130 may determine which TX beam(s) is/are feasible to be used.

Beam Recovery may be required, for example, for rapid link reconfiguration against sudden blockages. That is to say, beam recovery may be needed for re-aligning beams of BS 130 and UE 110 quickly if blockage has happened on a beam pair link(s) used between BS 130 and UE 110.

Beam Tracking and Refinement may comprise a set of procedures for refining beams transmitted by UE 110 and BS 130. Both, DL and UL RSs, may be used to refine the beams by UE 110 and BS 130. For instance, beams of BS 130 may be refined based on DL RS. BS 130 may transmit multiple Non-Zero-Power, NZP-CSI-RS resources or resource sets with resources corresponding to different DL transmit beams while UE 110 may use a fixed receive beam and indicate the best DL transmit beam to BS 130. Respectively, when refining beams transmitted by UE 110, BS 130 may transmit multiple NZP-CSI-RS resources within resource set using the same transmit beam while UE 110 may try different DL receive beams to find out the best one for the beam transmitted by BS 130.

Beam measurements and reporting as well as beam tracking and refinement functionalities may provide means for BS 130 to determine and control beam indication for downlink and uplink signals and channels. Beam indication may be seen as a process, wherein BS 130 may indicate a transmit beam of BS 130 to UE 110. Moreover, BS 130 may also indicate to UE 110 how to set a receive beam of UE 110 for downlink transmissions and how UE 110 should set a transmit beam for the uplink transmissions.

In some embodiments, beam management may be used with any system operating with beams. UEs 110 and 120 may be suitable for operating with beams and equipped with one or multiple antenna arrays or antenna modules per digital input. Both, transmission and reception, beam patterns per digital input may be narrower than an omnidirectional beam pattern.

Depending on a signal or channel in question, a beam indication mechanism may be defined as follows, e.g., in the context of NR. Concerning PDCCH, a UE may be configured by the BS using RRC signaling up to 64 Transmission Configuration Indication, TCI, states for a Control Resource Set, CORESET. Each TCI state may have one reference signal for providing a spatial domain parameter. That is to say, each TCI state may have one reference signal for characterizing a transmit beam of BS 130. Thus each TCI state may correspondingly have said one reference signal for characterizing a receive beam at UE 110 for example.

Said reference signal may be a SS/PBCH block or a NZP-CSI-RS, which may be used for beam management or time-frequency tracking. The CORESET may define time and frequency resources from where UE 110 may search for PDCCH candidates. PDCCH may be transmitted by BS 130 using different aggregation levels, ALs, and thus UE 110 may need to search PDCCH on CORESET trying different ALs. In some embodiments, one TCI state per CORESET is active at a time and to activate a certain TCI state BS 130 may need to transmit a command, such as a MAC CE activation command.

In some embodiments, UE 110 may be configured with three CORESETs at most. CORESET 0 may be used for scheduling, by BS 130, both broadcast and unicast traffic to UE 110. Separate spatial domain parameter configuration and activation signaling may be provided for each CORESET.

Concerning PDSCH, MAC CE activation command may be used to select up to eight TCI states that may be dynamically indicated by BS 130, possibly using DCI, when scheduling the PDSCH.

Concerning periodic NZP-CSI-RS, BS 130 may configure by RRC signaling a reference to one of the configured TCI states (up to 64) which provides Quasi-Co-Location, QCL, parameters to be applied when receiving NZP-CSI-RS.

Concerning NZP semi-persistent SP-CSI-RS, a MAC CE may be used to activate the configured NZP-SP-CSI-RS resource. The MAC CE may provide a TCI index for QCL parameters to be used. For example, a QCL source for the target NZP-SP-CSI-RS resource set may be provided by a list of TCI_State_IDs in the same MAC CE that activates the NZP-SP-CSI-RS resource set.

Concerning NZP aperiodic CSI-RS, a TCI index may be provided to indicate a source RS in spatial QCL sense for each aperiodic CSI-RS resource in a CSI-RS resource set associated with each CSI triggering state.

Concerning PUCCH, BS 130 may configure a UE using RRC signaling with up to 8 reference RSs (Spatial Relation Info) for each PUCCH resource. The term Spatial Relation Info may define the relation between the source and target reference signals in spatial QCL sense. In this example, UE should use same transmit target beam in uplink as a source reference RS. The reference RS may be downlink SS/PBCH index, CSI-RS resource index or an SRS resource index. In case of more than one configured reference RSs for the PUCCH resource, a MAC CE activation command may be used to select one of the reference RSs to be applied at a time.

UE 110 may determine a transmit beam for PUCCH based on an activated reference RS. In some embodiments, the maximum number of PUCCH resources in a first PUCCH resource set may be 32 and the maximum number of PUCCH resources in the other sets of PUCCH resources may be 8. Moreover, each PUCCH resource set may correspond to certain range of Uplink Control Information, UCI, bits whereas PUCCH resources within a resource set may provide resource allocation flexibility. Resource allocation flexibility may be provided by having resource specific frequency hopping parameters, PUCCH format (e.g., from format 0 to format 4), starting symbol, duration in number of symbols, cyclic shift parameter, Orthogonal Cover Code, OCC, index, OCC length, etc.

Concerning periodic SRS, P-SRS, BS 130 may configure by RRC signaling a reference RS for a P-SRS resource. The reference RS may be a SS/PBCH block, NZP-P-CSI-RS, NZP-SP-CSI-RS or P-SRS.

Concerning semi-persistent SRS, SP-SRS, BS 130 may configure a reference RS for a SP-SRS resource by using RRC signaling. The reference RS for the SP-SRS resource may be a SS/PBCH block, NZP-P-CSI-RS, NZP-SP-CSI-RS, P-SRS, SP-SRS. In some embodiments, a SP-SRS activation command for a SRS resource set in MAC may override RRC configured spatial info and provide a list of source RSs, one per SRS resource. A source RS may be a SS/PBCH block, NZP-P-CSI-RS, NZP-SP-CSI-RS, P-SRS or SP-SRS.

Concerning aperiodic SRS, AP-SRS, BS 130 may configure by RRC signaling a reference RS for an AP-SRS resource. The AP reference RS for the AP-SRS resource may be a SS/PBCH block, NZP-P-CSI-RS, NZP-SP-CSI-RS, P-SRS, SP-SRS, AP-SRS, NZP-AP-CSI-RS. In some embodiments, a DCI based triggering of a SRS resource set may be applied for triggering the transmission.

UE 110 may monitor a downlink control channel, such as a PDDCH, periodically during DRX OnDuration. For example, UE 110 may monitor the downlink control channel periodically to be aware of whether a downlink assignment or uplink grant is available. In some embodiments, UE 110 may expect that a TCI state associated with CORESET indicates the following Quasi-Co-Location, QCL, rules (see, e.g., TS 38.214 V.15.3.0, Section 5.1.5), for monitoring a PDCCH associated with a CORESET:

- '(QCL)-TypeA' with a CSI-RS resource in a NZP-CSI-RS-ResourceSet configured with higher layer parameter trs-Info and, when applicable, 'QCL-T D' with the same CSI-RS resource, or
- 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or
- 'QCL-TypeA' with a CSI-RS resource in a NZP-CSI-RS-ResourceSet configured without higher layer parameter trs-Info and without higher layer parameter repetition, when 'QCL-TypeD' is not applicable.

In other words, UE 110 may use a NZP-CSI-RS resource set, such as dedicated time and frequency Tracking Reference Signal, TRS, with periodic/aperiodic resources configured with trs-info as QCL-typeA source for DMRS of PDCCH to compensate residual time- and frequency offsets.

Also, UE 110 may use the NZP-CSI-RS resource set adapt the parameters of DMRS channel estimator, such as filter length in frequency and time, associated with a PDCCH. When QCL-type-D is applicable, a NZP-CSI-RS set with trs-info or NZP-CSI-RS set with repetition (DL beam management) may need to be used as a source.

However, problems may arise if said QCL rules associated with PDCCH monitoring are combined with DRX operation, such as DRX operation in accordance with 3GPP Rel-15 standard specifications. Such problems may be related to power consumption of UEs, e.g. UE 110, and scheduling restrictions of network nodes, e.g., BS 130.

Figure 4:
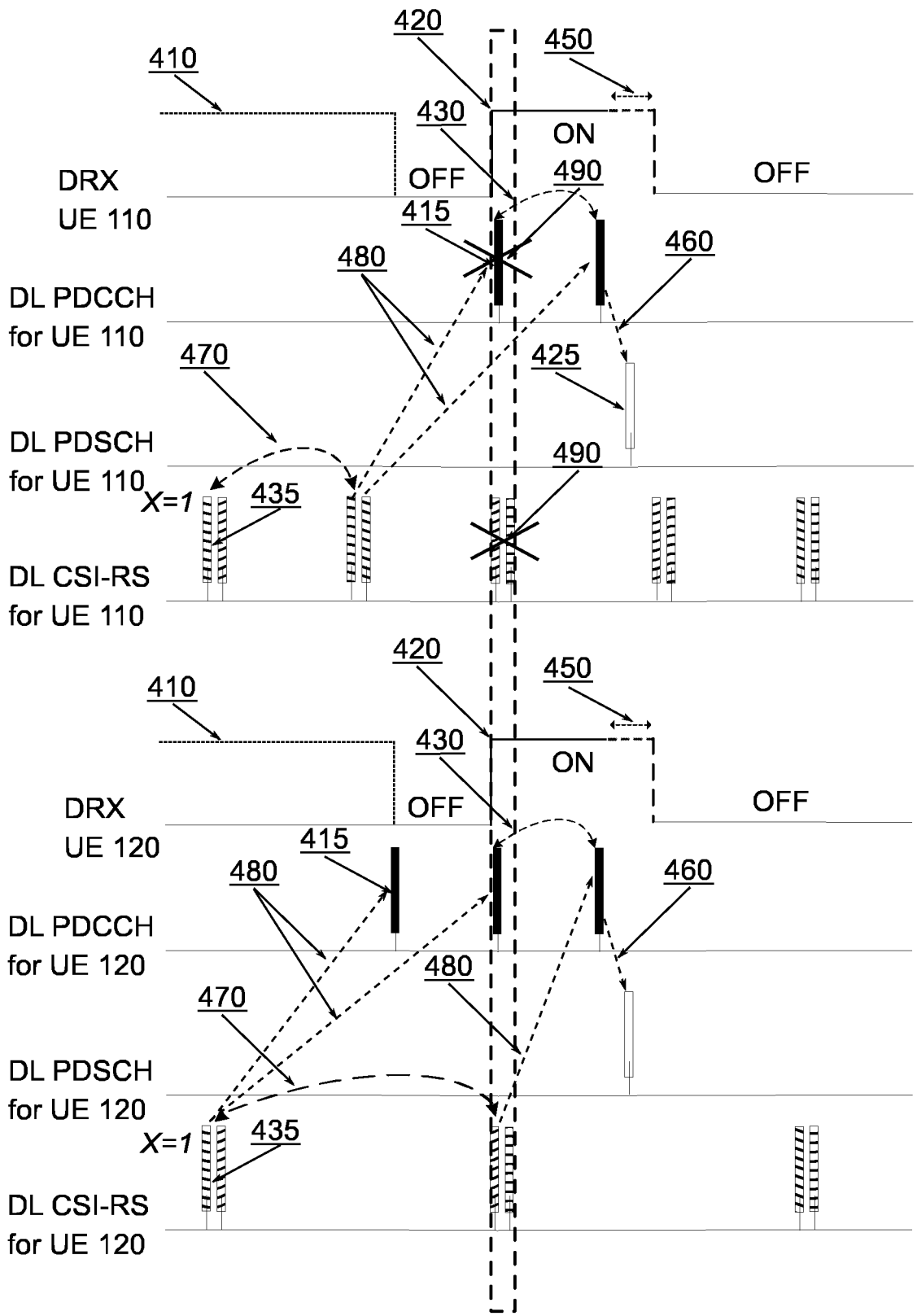
FIG. 4 illustrates an issue related to beam-based operation and DRX.

FIG. 4 illustrates an issue related to beam-based operation and UE power saving with DRX. More specifically, the illustrated issue is related to increased power consumption of UE 110 with beam-based DRX operation and PDCCH monitoring, e.g., in accordance with 3GPP Rel-15 NR standard specifications. Even though FIG. 4 demonstrates the issue in the context of NR, similar issues may occur in other beam-based wireless communication networks as well. With reference to FIG. 3, elements 410-460 of FIG. 4 may correspond to elements 310-360 of FIG. 3, respectively. In addition, in FIG. 4 DL NZP-CSI-RS (TRS) is denoted by 435 (rectangles with waves), periodicity is denoted by 470, QCL source for PDCCH is denoted by 480 and scheduling restriction is denoted by 490.

For a beam-based wireless communication network, any always-on, i.e. periodic broadcast/unicast, type of signal/channel transmission introduces additional scheduling restrictions. The reason for this is that the beam-based wireless communication network may have a limited hardware capability to transmit simultaneously multiple beams to different spatial directions, thereby leading to a single beam transmission into one spatial direction at a time while precluding transmissions to other spatial directions.

At least in the context of NR, UEs 110 and 120 may be configured with separate user-specific DRX traffic patterns as well as search space configurations associated with PDCCH monitoring. Both UEs 110 and 120 may use periodic TRSs with parameter X=1 as QCL type-A and type-D source for PDCCH monitoring. Parameter X may define a number of slots over which TRS estimates are computed at UEs 110 and 120.

UE 110 may be associated with a first beam. That is to say, there may be a first DL TX beam of PDCCH, PDSCH and TRS for UE 110. Similarly, UE 120 may be associated with a second beam. That is to say, there may be a second DL TX beam of PDCCH, PDSCH and TRS for UE 120.

As shown in FIG. 4, scheduling restriction 490 may occur because BS 130 may not be able to transmit on both, the first beam and the second beam, at the same time. That is to say, due to the occurrence of scheduling restriction 490 during DRX ON duration, BS 130 may not able to transmit simultaneously PDCCH for UE 110 and UE 120. Thus, PDSCH cannot be scheduled for UE 110 due to scheduling restriction 490 and inactivity timer 450 cannot be used either.

Therefore, UE 110 may be enforced to monitor PDCCH for a longer period of time compared to UE 120 to obtain downlink assignment via DCI. As a result of this, the power consumption of UE 110 increases compared to UE 120. Furthermore, the performance of PDCCH decoding may be degraded because UE 110 is imposed to use aged TRS estimates from previous DRX ON duration for PDCCH reception. That is to say, QCL source 480 for PDCCH 415 may be older for UE 110 when UE 110 obtains a downlink assignment via DCI and out-dated TRS may need to be used which would result in potential performance degradation in PDCCH monitoring.

As illustrated, beam-based operation with DRX, e.g., in accordance with 3GPP Rel-15 NR standard specifications, may lead to limited UE power saving efficiency and network scheduling restrictions on FR1 or FR2 or any beam based system.

Embodiments of the present invention provide a solution for avoiding this issue by providing signaling mechanisms that enable the adaptation downlink control channel monitoring configurations. For instance, embodiments of the present invention enable adaptation of the time location of DRX ON duration and downlink control channel search parameters according to DL TX beam(s) associated with a control resource set as well as reference signal resource set. Flexible alignment of control resource set transmit beam specific search space configuration in conjunction with the time location of DRX ON duration is thus enabled, thereby improving power saving of UEs and network scheduling flexibility on both FR1 and FR2 or any system operating with beams.

Furthermore, the network may configure the downlink control channel monitoring parameters associated with downlink beams, such as DRX parameter values associated with different TCI states, so that the OnDurations of UEs in the same spatial direction overlap. Alternatively, or in addition, the OnDurations in different beams may be aligned close to the TRS, i.e., beam specific NZP-CSI-RS. In some embodiments, the OnDurations may fall just after SSB bursts, so that UEs that need to do pre-synchronisation prior to OnDuration would not need wake-up for long until the actual monitoring time occasion.

Figure 5:
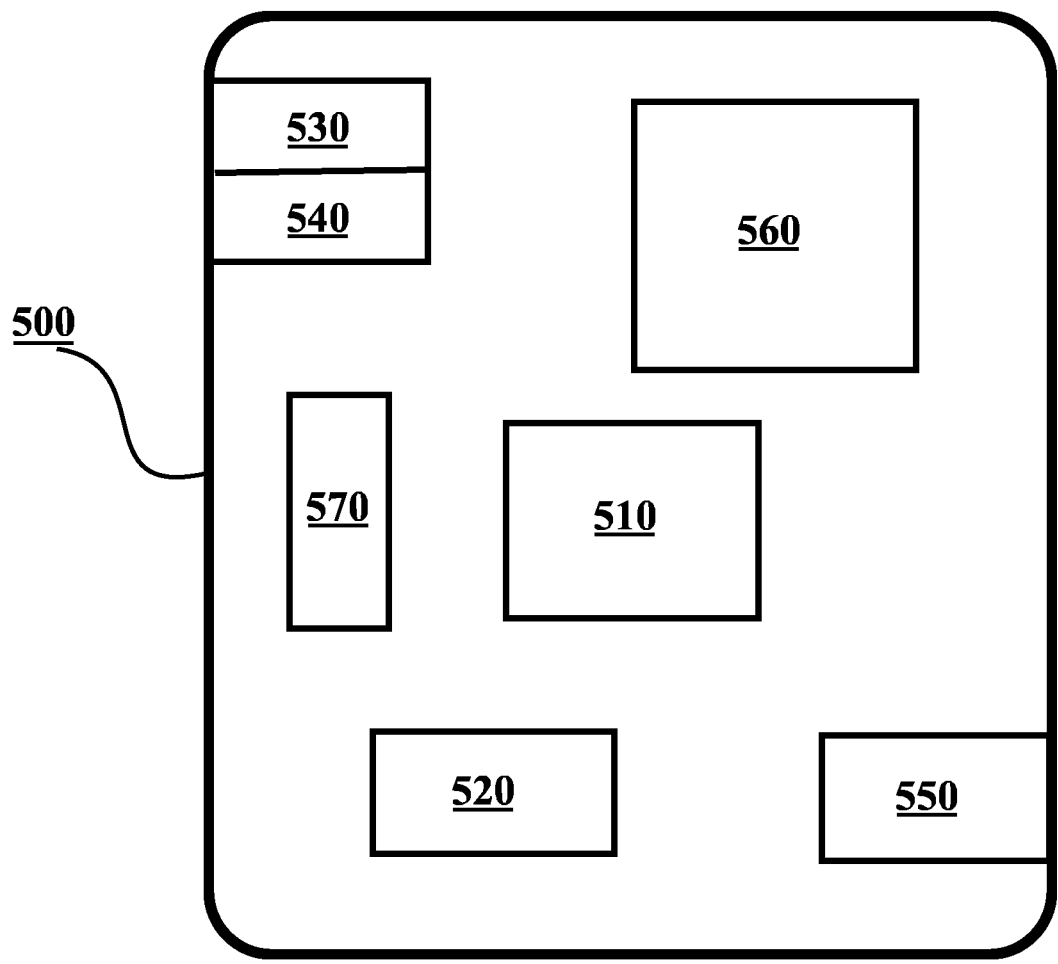
FIG. 5 illustrates an example apparatus capable of supporting at least some embodiments.

FIG. 5 illustrates an example apparatus capable of supporting at least some embodiments. Illustrated is device 500, which may comprise, for example, first UE 110, or wireless terminals in general, or BS 130, or a wireless network node in general. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. A processing core may comprise, for example, a Cortex-A8 processing core manufactured by ARM Holdings or a Steamroller processing core produced by Advanced Micro Devices Corporation. Processor 510 may comprise at least one Qualcomm Snapdragon and/or Intel Atom processor. Processor 510 may comprise at least one application-specific integrated circuit, ASIC. Processor 510 may comprise at least one field-programmable gate array, FPGA. Processor 510 may be means for performing method steps in device 500. Processor 510 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies)

that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 may comprise more than one transmitter. Receiver 540 may comprise more than one receiver. Transmitter 530 and/or receiver 540 may be configured to operate in accordance with Global System for Mobile communication, GSM, Wideband Code Division Multiple Access, WCDMA, 5G/NR, Long Term Evolution, LTE, IS-95, Wireless Local Area Network, WLAN, Ethernet and/or Worldwide Interoperability for Microwave Access, WiMAX, standards, for example.

Device 500 may comprise a Near-Field Communication, NFC, transceiver 550. NFC transceiver 550 may support at least one NFC technology, such as Bluetooth, or similar technologies.

Device 500 may comprise User Interface, UI, 560. UI 560 may comprise at least one of a display, a keyboard, a touchscreen, a vibrator arranged to signal to a user by causing device 500 to vibrate, a speaker and a microphone. A user may be able to operate device 500 via UI 560, for example to accept incoming telephone calls, to originate telephone calls or video calls, to browse the Internet, to manage digital files stored in memory 520 or on a cloud accessible via transmitter 530 and receiver 540, or via NFC transceiver 550, and/or to play games.

Device 500 may comprise or be arranged to accept a user identity module 570. User identity module 570 may comprise, for example, a Subscriber Identity Module, SIM, card installable in device 500. A user identity module 570 may comprise information identifying a subscription of a user of device 500. A user identity module 570 may comprise cryptographic information usable to verify the identity of a user of device 500 and/or to facilitate encryption of communicated information and billing of the user of device 500 for communication effected via device 500.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively to a serial bus, the receiver may comprise a parallel bus receiver.

Device 500 may comprise further devices not illustrated in FIG. 5. For example, where device 500 comprises a smartphone, it may comprise at least one digital camera. Some devices 500 may comprise a back-facing camera and a front-facing camera, wherein the back-facing camera may be intended for digital photography and the front-facing camera for video telephony. Device 500 may comprise a fingerprint sensor arranged to authenticate, at least in part, a user of device 500. In some embodiments, device 500 lacks at least one device described above. For example, some devices 500 may lack a NFC transceiver 550 and/or user identity module 570.

Processor 510, memory 520, transmitter 530, receiver 540, NFC transceiver 550, UI 560 and/or user identity module 570 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the embodiment various ways of interconnecting at least two of the aforementioned devices may be selected without departing from the scope of the embodiments.

In some embodiments of the present invention, a configuration for monitoring a downlink control channel may be adapted, i.e., changed. First, UE 110 may configure a receiver for monitoring at least one first downlink control channel associated with at least one first downlink beam of a beamformed transmission according to a first configuration of time domain behaviour. In some embodiments, the first configuration for monitoring at least one first downlink control channel associated with at least one first downlink beam of a beamformed transmission may be transmitted by BS 130 to UE 110. Then, BS 130 may determine that there is a need for overriding the first configuration, e.g., by determining that there is a possible scheduling restriction. The scheduling restriction may be between UE 110 and UE 120. Alternatively, or in addition, BS 130 may determine that there is a need for changing from the at least one first downlink beam to at least one second downlink beam, e.g., by determining that UE 110 moves under the at least one second downlink beam.

In response to determining that there is a need for overriding the first configuration or changing from the at least one first downlink beam to at least one second downlink beam, BS 130 may transmit to UE 110 a first command to configure a receiver for monitoring the at least one first downlink control channel associated with the at least one second downlink beam according to a second configuration of time domain behaviour and/or a second command for activating a second configuration for monitoring the at least one first downlink control channel associated with the at least one first downlink beam. The first and the second commands may be MAC CE commands. Alternatively, or in addition, the first and the second commands may be separate commands or a single command, e.g., with one MAC CE or in separate MAC CEs, or with one L1 indication or in separate L1 indications.

UE 110 may configure, in response to receiving the first command, a receiver for monitoring the at least one first downlink control channel associated with the at least one second downlink beam according to the second configuration. Similarly, UE 110 may receiving a second command for activating the second configuration of time domain behaviour for monitoring the at least one first downlink control channel associated with the at least one second downlink beam, and configure/activate the receiver accordingly. In some embodiments, UE 110 may then receive a first control message from BS 130 using the at least one first downlink control channel according to the second configuration. Similarly, the first configuration may be transmitted by BS 130 using Radio Resource Control, RRC, signaling, and the first command may be transmitted using Media Access Control, MAC, signalling or Layer 1, L1 signaling.

In some embodiments of the present invention, a configuration framework, such as TCI associated with control resource sets, may be enhanced by enabling joint adaptation of a downlink transmit beam specific downlink control channel search space configuration and/or a time location of DRX ON time, i.e, OnDuration.

Said first and second configurations for monitoring a downlink control channel may comprise a downlink transmit beam specific downlink control channel search space configuration and/or a DRX configuration. The DRX configuration may comprise a time location of DRX ON time. In other words, the DRX configuration may comprise a starting time and/or duration for monitoring the downlink control channel. Generally speaking, configurations for monitoring a downlink control channel associated with a downlink beam may be transmitted by BS 130 to, e.g., UE 110.

BS 130 may also transmit the first and/or the second command to UE 110 to activate the adaptation, i.e., to activate a second configuration for monitoring the downlink control channel instead of a first configuration. The first and the second configurations may be associated with a downlink beam and hence, the first and/or the second command may activate a second configuration for a TCI state associated with a control resource set, such as CORESET. In some embodiments, the first and/or the second command may therefore lead to alignment of the time location of DRX ON duration and/or PDCCH search space parameters with DL TX beam(s) associated with the CORESET.

Furthermore, in some embodiments, adaptation of the time location of DRX ON time according to DL TX beam associated with a reference signal resource set, such as NZP-CSI-RS resource. That is to say, the first and the second configurations may be associated with the reference signal resource set.

In some embodiments, a dedicated command, such as a dedicated MAC CE activation command, may be used to simultaneously adapt a control resource set specific search space and DRX parameters. Thus, the dedicated command may be used to adapt search space and DRX parameters to be the same for all beams, e.g. for all configured TCI states, associated with a control resource set or reference signal resource set, or resource set. That is to say, the dedicated command may be used to adapt the configuration for monitoring the downlink control channel to be the same for all TCI states configured for UE 110.

In some embodiments, a first dynamic mechanism for a beam dependent monitoring of the downlink control channel may be defined. That is to say, the first dynamic mechanism may define a TCI state dependent monitoring of the downlink control channel. For example, a time location of DRX ON time duration and/or downlink control channel search space may be defined. The beam dependent, i.e., TCI state dependent, monitoring may be control resource set specific.

In some embodiments, a configuration for monitoring a downlink control channel associated with a downlink beam, corresponding to a TCI state, may comprise slot periodicity and offset values, i.e., fields, associated with a downlink control channel search space. For example, the values may be associated with a downlink control channel search space of a control resource set. Said offsets may be explicit offset values or relative values with respect to previously configured offset values.

Alternatively, or in addition, a configuration for monitoring a downlink control channel associated with a downlink beam, corresponding to a TCI state, may comprise a slot offset field associated with DRX. That is to say, the configuration may comprise DRX slot-offset(s) for short and/or long cycle(s). Again, said offsets may be explicit offset values or relative values with respect to previously configured offset values.

Single or multiple beam(s), corresponding TCI state(s), may be activated by BS 130 for downlink control channel reception of a control resource set by transmitting the first or the second command to UE 110, e.g., a MAC CE. In such a case, an earlier RRC configured configuration for monitoring a downlink control channel, possibly comprising a search space, i.e., slot-periodicity and offset, and/or DRX slot-offset (short and/or long cycle) related parameters may be overwritten, or overridden, with the values defined in a TCI table.

In general, the earlier RRC configured configuration for monitoring the downlink control channel may be referred to as a first configuration. Thus, a second configuration for monitoring the downlink control channel may overwrite, or override, the first configuration.

For example, in a case of simultaneous activation of multiple TCI states, same configuration for monitoring a downlink control channel, e.g., same parameter values for search space and/or DRX slot-offset, among activated TCI states may be used. That is to say, UE 110 may receive a TCI state table, wherein the TCI state table comprises information about multiple TCI states, and activate multiple TCI states according to the second configuration.

On the other hand, in case of activation of a single TCI state, different TCI states can have different configurations for monitoring a downlink control channel, e.g., different for search space and DRX slot-offset parameter values. That is to say, UE 110 may be configured to use a first configuration for monitoring a downlink control channel associated with a first TCI state and a second configuration for monitoring a downlink control channel associated with a second TCI state. Therefore, control resource set specific joint DL TX, DL RX, search space and DRX ON duration time location adaptation may be enabled based on the first command, such as a MAC CE activation command.

In some embodiments, a second dynamic mechanism for a beam dependent monitoring of the downlink control channel may be defined. That is to say, the second dynamic mechanism may define a TCI state dependent monitoring of the downlink control channel. The beam dependent, i.e., TCI state dependent, monitoring may be specific for a reference signal resource or a resource set, such as NZP-CSI-RS specific resource or a resource set.

In some embodiments, a configuration for monitoring a downlink control channel associated with a downlink beam, i.e., a TCI state, may comprise a slot offset field associated with DRX. That is to say, the configuration may comprise DRX slot-offset(s) for short and/or long cycle(s). Again, said offsets may be explicit offset values or relative values with respect to previously configured offset values.

Single or multiple beam(s), corresponding TCI state(s), may be activated by BS 130 for downlink control channel reception of a reference signal resource, or resource set, by transmitting the first or the dedicated command to UE 110, e.g., a MAC CE. In such a case, an earlier RRC configured configuration for monitoring a downlink control channel, possibly comprising DRX slot-offset (short and/or long cycle) related parameters, may be overwritten, or overridden, with the values defined in a TCI table. The earlier RRC configured configuration for monitoring the downlink control channel may be referred to as a first configuration. Thus, a second configuration for monitoring the downlink control channel may overwrite, or override, the first configuration.

For example, in a case of simultaneous activation of multiple TCI states, same configuration for monitoring a downlink control channel, e.g., same parameter values for DRX slot-offset, among activated TCI states may be used. That is to say, UE 110 may receive a TCI state table, wherein the TCI state table comprises information about multiple TCI states, and activating multiple TCI states in response to receiving the second configuration.

On the other hand, in case of activation of a single configuration associated with a downlink beam, corresponding to a TCI state, different downlink beams may have different configurations for monitoring a downlink control channel, e.g., different for DRX slot-offset parameter values. Therefore, a reference signal resource, or resource set, specific joint DL TX, DL RX and DRX ON duration time location adaptation may be enabled based on the first command, such as a MAC CE activation command.

That is to say, UE 110 may be configured to use a first configuration for monitoring a downlink control channel associated with a first beam, i.e., first TCI state, and UE 110 may also be configured to use the second configuration for monitoring the first downlink control channel associated with a second downlink beam, i.e., second TCI state. In general, the second configuration for monitoring the first downlink control channel associated with a second downlink beam may comprise similar information as the first and the second configurations for monitoring the first downlink control channel associated with the first downlink beam. The second configuration for monitoring the first downlink control channel associated with the second downlink beam may be activated by BS 130 as well. Also BS 130 may transmit a second control message using the first downlink control channel according to the second configuration, upon activation of the second configuration.

In general, the configurations may be configurations of time domain behavior. In some, embodiments, the second configuration of time domain behaviour may be an adjustment of the first configuration of time domain behaviour. Moreover, the same first downlink control channel may be associated with the at least one first and second downlink beams, e.g., the same CORESET may be used.

For example, BS 130 may configure UE 110 to use the first configuration for monitoring at least one first downlink control channel associated with at least one first downlink beam and then determine that UE 110 moves, or is about to move, under at least one second downlink beam. BS 130 may determine that UE 110 moves, or is about to move, under at least one second downlink beams, for example, by measuring received powers on different beams. In response to the determination, BS 130 may transmit a first command for changing from the at least one first downlink beam to at least one second downlink beam. UE 110 may thus configure a receiver for monitoring the at least one first downlink control channel associated with the at least one second downlink beam according to the second configuration.

In some embodiments, a command, such as a dedicated MAC CE activation command, for adaptation of the configuration for monitoring of the downlink control channel may be defined. The command may be transmitted from BS 130 to UE 110. In some embodiments, the command may be referred to as a first and/or a second command. For example, adaptation of a downlink control channel search space of a control resource set and DRX parameters may be defined. The command may activate a second configuration and the second configuration may overwrite, or override, the first configuration. That is to say, the command may activate the second configuration to overwrite, or override, the first configuration of downlink control channel search space of the control resource set and DRX slot-offset higher-layer configured parameters. For example, the control resource set specific search space and DRX Slot-Offset MAC CE command may be defined to include one or more of the following parameters:

Identity identifier, ID, information associated with CORESET

Search space ID information associated with CORESET with following parameters
  Search space monitoring periodicity
  Search space slot-offset
    Offset may be an explicit offset value or relative offset value with respect to previously configured offset values
  DRX slot-offset for a short cycle
    Offset may be explicit an offset value or relative offset value with respect to previously configured ones
  DRX slot-offset for a long cycle
    Offset may be explicit offset value or relative offset value with respect to previously configured ones Table 1 shows a first example of a TCI state table in accordance with some embodiments. Table 1 demonstrates a TCI state table with TX DL beam specific search space configuration for CORESET#K. The TCI state table comprises information about TCI states. Moreover, the TCI state table may be transmitted from BS 130 to UE 110 and thus information about a TCI state may be transmitted to UE 110 as well. Table 1 demonstrates a TCI state table for TX DL beam specific search space configuration adaptation associated with CORESET#K, where the parameter #K is identity indicator of CORESET. When a MAC CE activates one of the TCI states in the table, a dynamic joint DL TX beam specific and CORESET search space monitoring configuration may be enabled. It is worth noting that one TCI state may refer to one reference signal, to provide spatial domain parameter, i.e. to characterize the transmit beam and thus correspondingly the DL RX beam at UE 110. Four different TCI states may be associated with CORESET#K, wherein one additional state for each TCI state is added. Moreover, additional TCI states, i.e., states 1 and 3 in Table 1, may be configured by RRC-signaling. The fourth column of the table defines different search space configuration monitoring options for each TCI state associated with CORESET#K. In some embodiments, MAC CE activation command may be used to overwrite existing RRC-configured search space values, e.g., to command TCI state 1 (with search space configuration (x1,x2)=14.3, where x1 defines search space periodicity of CORESET and x2 slot offset within the slot periodicity.) or 3 (with search space configuration 12.1) to be used.

TABLE 1

A first example of a TCI state table in accordance with some embodiments

| TCI state #ID | QCL-type 1 | QCL-type 2 | Search space: monitoringSlotPeriodicityandOffset |
|---|---|---|---|
| 0 | {cell#j, #1, NZP-CRI#g, typeA} | {cell#j, #1, NZP-CRI#v, typeD} | — (default) |
| 1 | {cell#j, #1, NZP-CRI#g, typeA} | {cell#j, #1, NZP-CRI#v, typeD} | 14, 3 |
| 2 | {cell#j, #1, NZP-CRI#x, typeA} | {cell#j, #1, NZP-CRI#h, typeD} | — (default) |
| 3 | {cell#j, #1, NZP-CRI#x, typeA} | {cell#j, #1, NZP-CRI#h, typeD} | 12, 1 |

Table 2 shows a second example of a TCI state table in accordance with some embodiments. The TCI state table comprises information about TCI states. Moreover, the TCI state table may be transmitted from BS 130 to UE 110 and thus information about a TCI state may be transmitted to UE 110 as well. Table 2 demonstrates an enhanced TCI state table with joint TX DL beam specific search and DRX configuration for CORESET#K (active DRX configuration). Moreover, Table 2 shows an example of a signaling scheme, wherein the TCI state table may be transmitted from BS 130 to UE 110. When a MAC CE activates one of the TCI states associated with CORESET#K, it may simultaneously overwrite, or override, the existing value related to a PDCCH search space slot periodicity and offset as well as DRX slotOffset. As a result of this, a joint dynamic adaptation of a DL TX beam specific search space monitoring as well as time location of DRX ON time may be enabled. Four different TCI states may be associated with CORESET#K, wherein one additional state for each "default" state is added. The table is configured by additional TCI states, i.e, states 1 and 3, and may be transmitted using RRC-signaling. The fourth column of the table defines different search space configuration monitoring options while the fifth column defines different DRX SlotOffset options for each TCI state associated with CORESET#K. In some embodiments, MAC CE activation commands may be used to overwrite existing RRC-configured search space values and DRX SlotOffsets.

TABLE 2

A second example of a TCI state table in accordance with some embodiments

| TCI state #ID | QCL-type 1 | QCL-type 2 | Search space: Slot-periodicity & Offset | DRX SlotOffset |
|---|---|---|---|---|
| 0 | {cell#j, #1, NZP-CRI#g, typeA} | {cell#j, #1, NZP-CRI#v, typeD} | — (default) | — (default) |
| 1 | {cell#j, #1, NZP-CRI#g, typeA} | {cell#j, #1, NZP-CRI#v, typeD} | 14, 4 | 4 |
| 2 | {cell#j, #1, NZP-CRI#x, typeA} | {cell#j, #1, NZP-CRI#h, typeD} | — (default) | — (default) |
| 3 | {cell#j, #1, NZP-CRI#x, typeA} | {cell#j, #1, NZP-CRI#h, typeD} | 12, 2 | 2 |

FIG. 6 illustrates an example of a definition of a TCI state in accordance with at least some embodiments. The TCI state of FIG. 6 may enable dynamic joint TX beam, search space and DRX configuration indication for a CORESET. In the example of FIG. 6, the TCI state may comprise values in the parenthesis, such as Slot-periodicity and Slot-Offset corresponding to possible values of a search space configuration for a CORESET. Furthermore, the TCI state may comprise an SlotOffset value associated with DRX-SlotOffset reflecting the value range of active DRX configuration.

Figure 7:
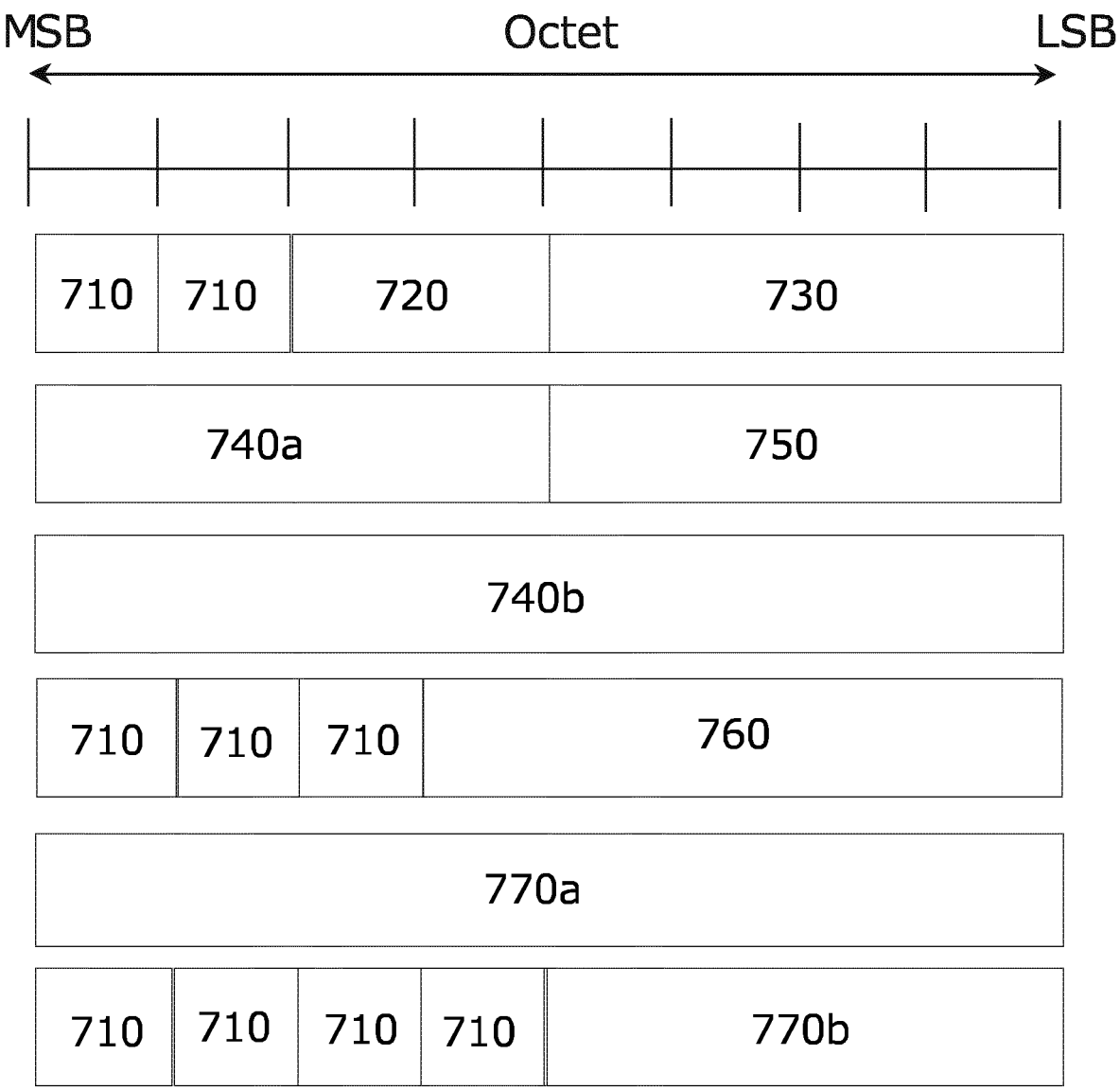
FIG. 7 illustrates a first example of a MAC CE in accordance with at least some embodiments.

FIG. 7 illustrates a first example of a MAC CE in accordance with at least some embodiments. Said first example of a MAC CE shows an example of DRX (both short and long cycle) slot offset and CORESET as well as search space specific activation MAC CE for rewriting, or overriding, the existing DRX and CORESET higher-layer configured parameters.

The illustrated MAC CE may comprise reserved bits 710 (set to 0), CORESET ID 720 (2 bits), search space ID 730 (4 bits), search space slot offset part 1 740*a* (the first 4 Least Significant Bits, LSBs, of 12-bit SS-Offset), search space slot offset part 2 740*b* (the first 8 Most Significant Bits, MSBs, of 12-bit SS-Offset), search space monitoring slot periodicity 750 (4 bits), DRX-slot offset for short DRX cycle 760 (5 bits), DRX slot offset for long DRX cycle 770*a* (the first 8 LSBs of 12 bit-Long DRX Offset) and DRX slot offset for long DRX cycle 770*b* (the first 4 MSBs of 12 bit-Long DRX Offset)

Figure 8:
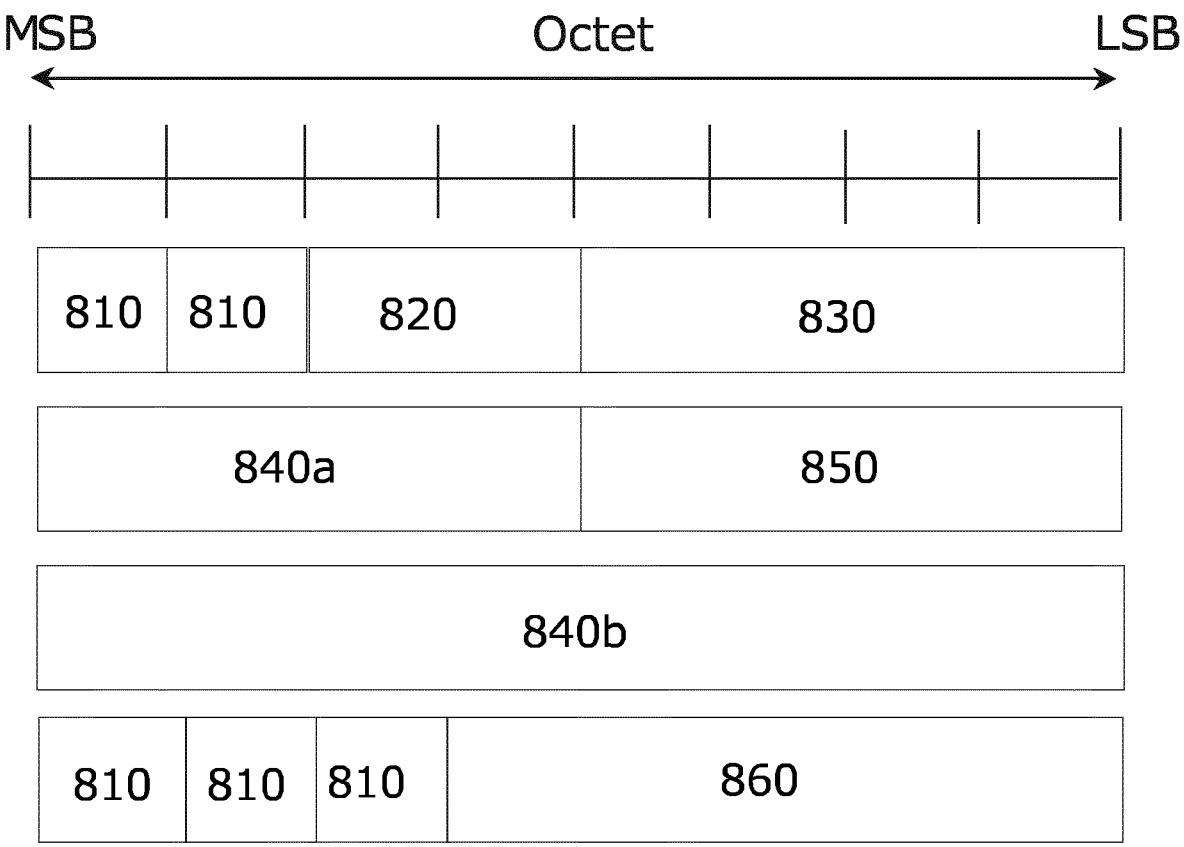
FIG. 8 illustrates a second example of a MAC CE in accordance with at least some embodiments.

FIG. 8 illustrates a second example of a MAC CE in accordance with at least some embodiments. Said second example of a MAC CE shows an example of DRX short cycle slot offset and CORESET as well as search space specific activation MAC CE for rewriting, or overriding, the existing DRX and CORESET higher-layer configured parameters. With reference to FIG. 7, the illustrated MAC CE of FIG. 8 may comprise elements 810-860 which may correspond to elements 710-760 of FIG. 7.

Figure 9:
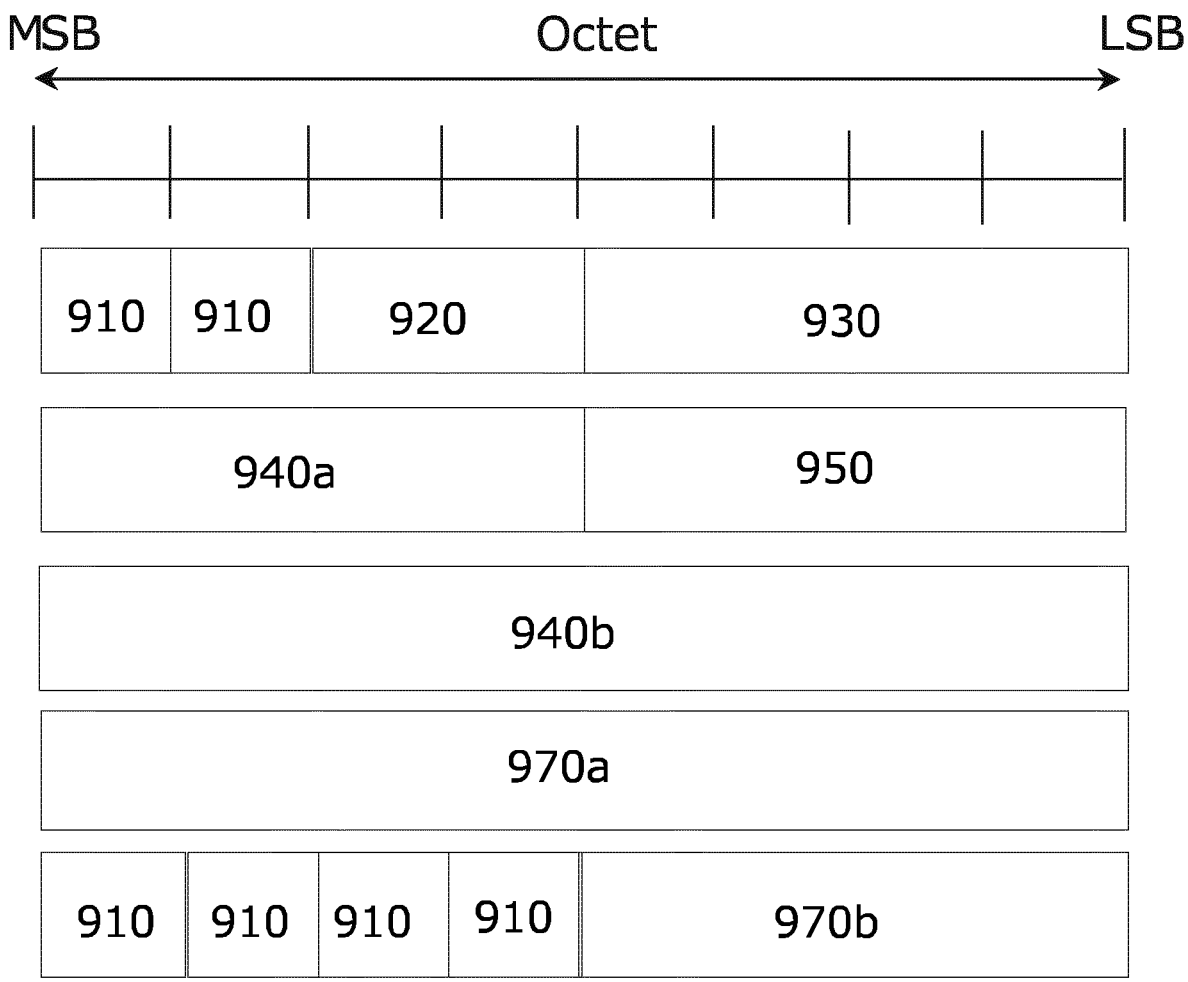
FIG. 9 illustrates a third example of a MAC CE in accordance with at least some embodiments.

FIG. 9 illustrates a third example of a MAC CE in accordance with at least some embodiments. Said third example of a MAC CE shows an example of DRX long cycle slot offset and CORESET as well as search space specific activation MAC CE for rewriting, or overriding, the existing DRX and CORESET higher-layer configured parameters. With reference to FIG. 7, the illustrated MAC CE of FIG. 9 may comprise elements 910-970*b* which may correspond to elements 710-770*b* of FIG. 7. However, said third example of a MAC CE may not comprise DRX-slot offset for short DRX cycle 760.

The MAC CEs of FIGS. 7, 8 and 9 may be used as command for activating a second configuration for monitoring the at least one first downlink control channel associated with the at least one first downlink beam, and transmitted from BS 130 to UE 110.

In some embodiments, the command for activating the second configuration for monitoring the at least one first downlink control channel associated with the at least one first beam may be transmitted by BS 130 and received by UE 110 by using Layer 1, L1, signaling. That is to say, the TCI state change, or adaptation, may be moved from MAC to L1.

Figure 10:
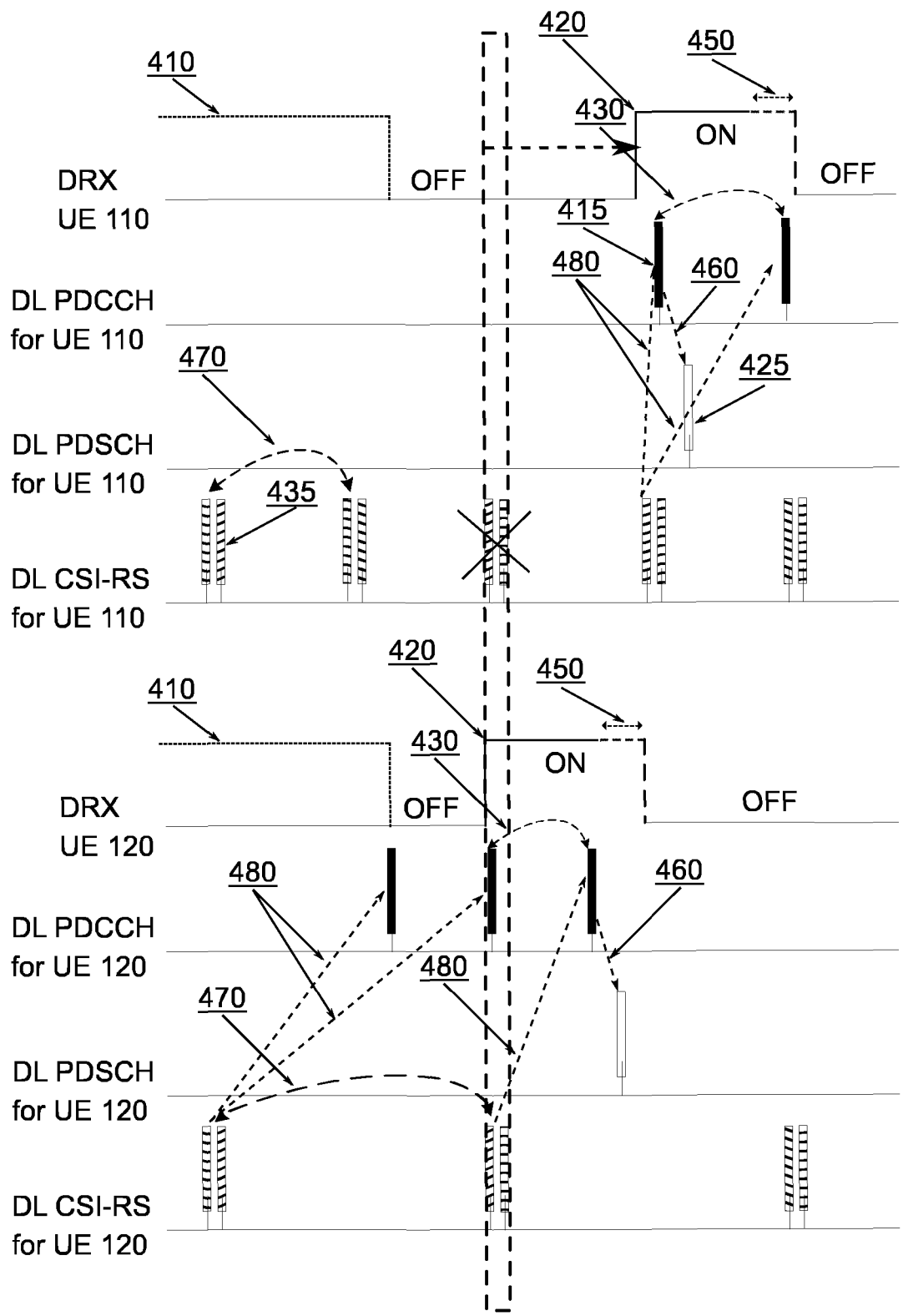
FIG. 10 illustrates an example of a beam-based operation and DRX in accordance with at least some embodiments.

FIG. 10 illustrates an example of a beam-based operation and DRX in accordance with at least some embodiments. With reference to FIG. 4, elements 410-480 in FIG. 10 may correspond to elements 410-480 in FIG. 4. As shown in FIG. 10, embodiments of the present invention enable flexible alignment of time location of DRX ON time and downlink control channel search space slot offset and search space periodicity according to DL TX beams associated with a reference signal resource, or resource set. As a result of this, power savings may be enabled for UE 110 by reducing monitoring time of a downlink control channel as well as allowing DRX inactivity timer 450 to expire at UE 110. Furthermore, embodiments of the present invention also enable scheduling flexibility for BS 130 and may be used to avoid scheduling restrictions. The use of up-to-date TRS estimates results in proper performance in downlink control channel monitoring.

Figure 11:
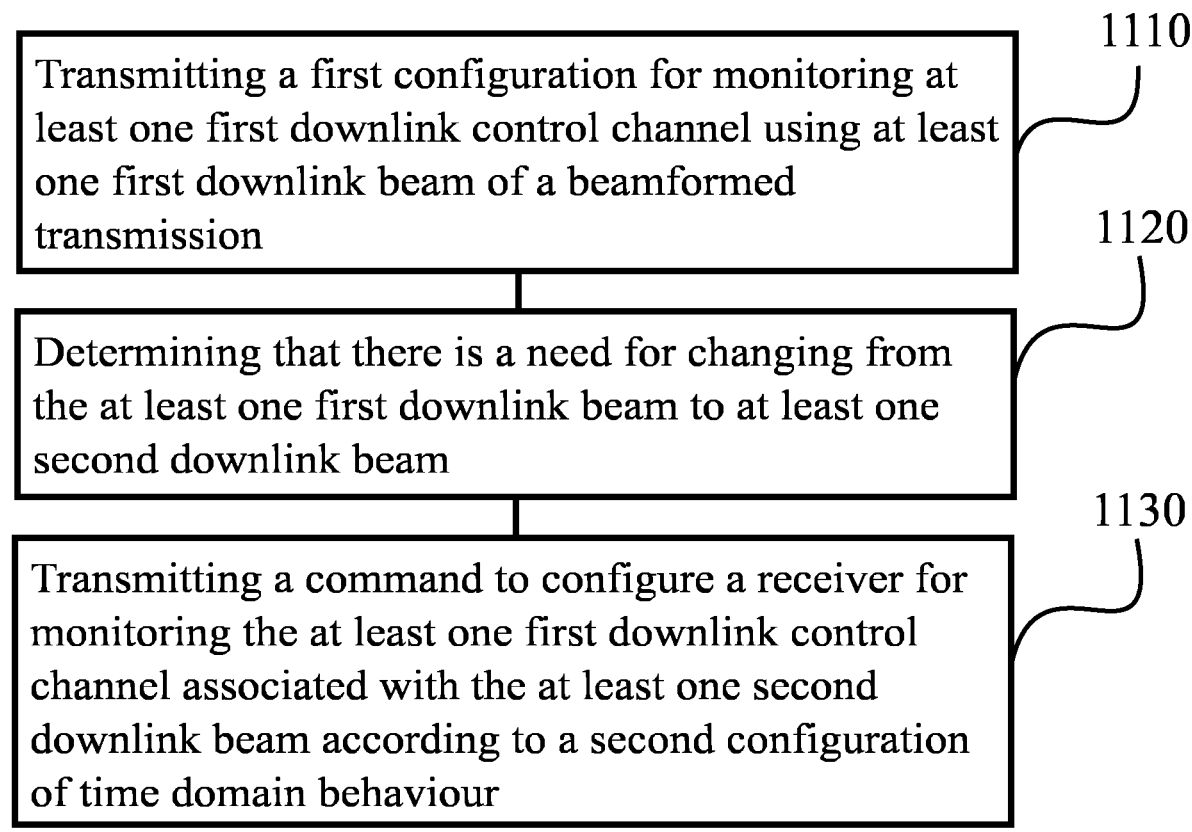
FIG. 11 illustrates a flow graph of a first method in accordance with at least some embodiments.

FIG. 11 is a flow graph of a first method in accordance with at least some embodiments. The phases of the illustrated first method may be performed by BS 130, or wireless network node in general, or by a control device configured to control the functioning thereof, possibly when installed therein.

The first method may comprise, at step 1110, transmitting a first configuration of time domain behaviour for monitoring at least one first downlink control channel using, or associated with, at least one first downlink beam of a beamformed transmission. The first method may also comprise, at step 1120, determining that there is a need for changing from the at least one first downlink beam to at least one second downlink beam. Finally, the first method may comprise, at step 1130, transmitting a first command to configure a receiver for monitoring the at least one first downlink control channel associated with the at least one second downlink beam according to a second configuration of time domain behaviour.

Figure 12:
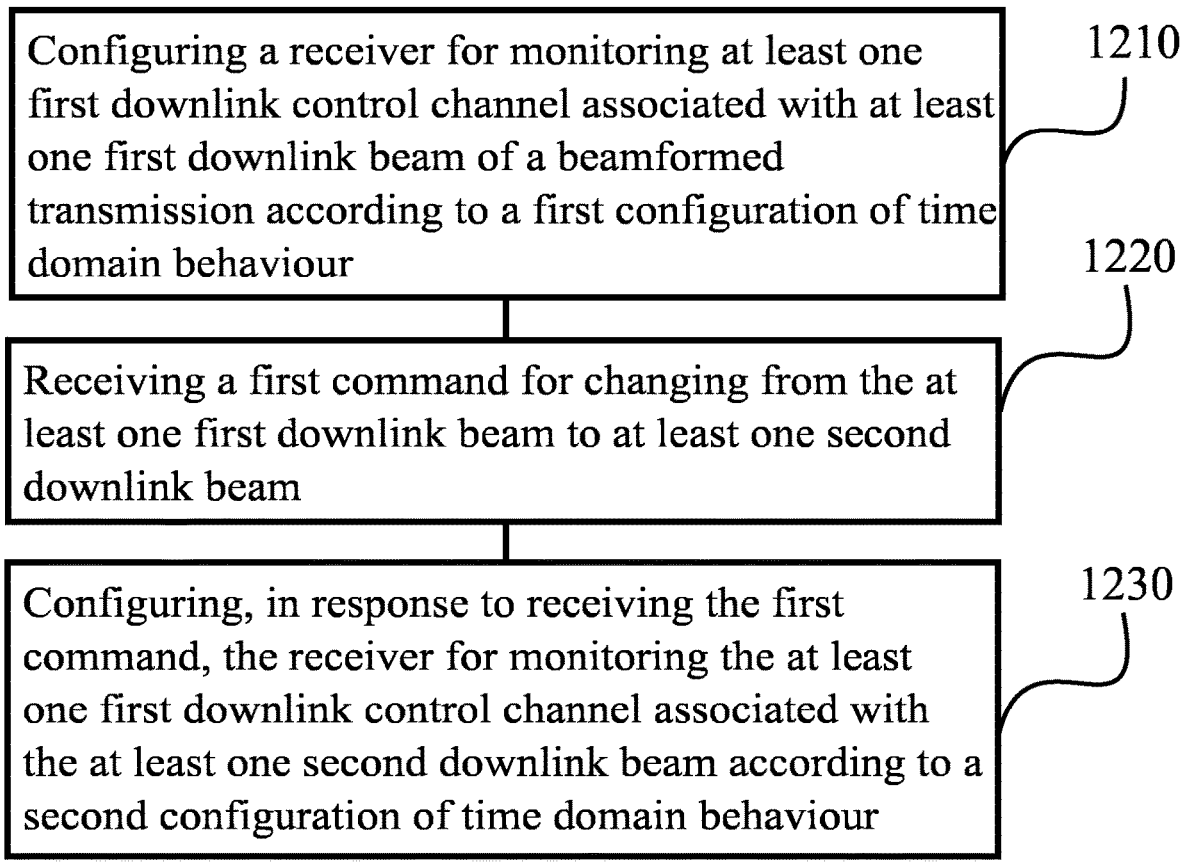
FIG. 12 illustrates a flow graph of a second method in accordance with at least some embodiments.

FIG. 12 is a flow graph of a second method in accordance with at least some embodiments. The phases of the illustrated second method may be performed by UE 110, or wireless terminal or mobile station in general, or by a control device configured to control the functioning thereof, possibly when installed therein.

The second method may comprise, at step 1210, configuring a receiver for monitoring at least one first downlink control channel associated with at least one first downlink beam of a beamformed transmission according to a first configuration of time domain behaviour. The second method may also comprise, at step 1210, receiving a first command for changing from the at least one first downlink beam to at least one second downlink beam. Finally, the second method may comprise, at step 1230, configuring, in response to receiving the first command, the receiver for monitoring the at least one first downlink control channel associated with the at least one second downlink beam according to a second configuration of time domain behaviour.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, a wireless terminal, such as UE 110, or a wireless network node, such as BS 130, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, a wireless terminal, such as UE 110, or a wireless network node, such as BS 130, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in beam-based wireless communication networks. More specifically, at least some embodiments find industrial application in cellular communication networks, such as in 5G/NR networks.

ACRONYMS LIST

3GPP 3rd Generation Partnership Project
AL Aggregation Level
BS Base Station
C-DRX Connected mode DRX
C-RNTI Cell-Radio Network Temporary Identifier
CE Control Element
CORESET Control Resource Set
CSI-RS Channel State Information-Reference Signal
DCI Downlink Control Indicator
DL Downlink
DL TX Downlink Transmission
DMRS Demodulation Reference Signal
DRX Discontinuous Reception
eFEMTC even Further Enhanced Machine Type Communication
eMTC enhanced MTC
eFE-NB-IoT Even Further Enhanced Narrowband IoT
FFT Fast Fourier Transform
FR Frequency Range
GSM Global System for Mobile communication
IEEE Institute of Electrical and Electronics Engineers
IoT Internet of Things
IP Internet Protocol
L1 Layer 1
LSB Least Significant Bit
LTE Long-Term Evolution
M2M Machine-to-Machine
MAC Media Access Control
MIB Master Information Block
MSB Most Significant Bit
MTC Machine-Type Communications
NFC Near-Field Communication
NZP Non-Zero-Power
NR New Radio
OCC Orthogonal Cover Code
P-RNTI Paging-Radio Network Temporary Identifier
PBCH Physical Broadcast Channel
PDCCH Physical Downlink Control Channel
PDSCH Physical Downlink Shared Channel
PUCCH Physical Uplink Control Channel
PUSCH Physical Uplink Shared Channel
PSS Primary Synchronization Signal
QCL Quasi Co-Location
RAT Radio Access Technology
RRC Radio Resource Control
RRM Radio Resource Management
RS Reference Signal
RSRP Reference Signal Received Power
SFN System Frame Number
SIB System Information Block
SIM Subscriber Identity Module
SR Scheduling Request
SRS Sounding Reference Signal
SSB Synchronization Signal Block
SSS Secondary Synchronization Signal
TCI Transmission Configuration Indication
TRS Tracking Reference Signal
UCI Uplink Control Information
UE User Equipment
UI User Interface
UL Uplink
UL TX Uplink Transmission
WCDMA Wideband Code Division Multiple Access
WiMAX Worldwide Interoperability for Microwave Access
WLAN Wireless Local Area Network

| REFERENCE SIGNS LIST | |
|---|---|
| 110, 120 | Wireless terminal, e.g., UE |
| 130 | Wireless network node, e.g., BS |
| 140 | Core network |
| 115, 135, 145 | Interfaces |
| 210 | Wake-up signal, i.e., activity preamble |
| 220 | Delay |
| 230 | Downlink control channel |
| 240 | Downlink shared channel |
| 310, 410 | Active time |
| 315, 415 | Transmission on a downlink control channel |
| 320, 420 | DRX slotOffset w.r.t SFN |
| 325, 425 | Transmission on a downlink shared channel |
| 330, 430 | search space periodicity and offset |
| 340 | C-DRX cycle |
| 350, 450 | Inactivity timer |
| 360, 460 | K0 scheduling delay |
| 435 | DL CSI-RS (TRS) |
| 470 | Periodicity |
| 480 | QCL source |
| 490 | Scheduling restriction |
| 500-570 | Structure of the apparatus of FIG. 5 |
| 710, 810, 910 | Reserved bits |
| 720, 820, 920 | CORESET ID |
| 730, 830, 930 | Search space ID |
| 740a, 740b, 840a, 840b, 940a, 940b | Search space slot offset parts |
| 750, 850, 950 | Search space monitoring slot periodicity |
| 760, 860 | DRX-slot offset for short DRX cycle |
| 770a, 770b, 970a, 970b | Parts of DRX slot offset for long DRX cycle |
| 1110-1130 | Phases of the first method in FIG. 11 |
| 1210-1230 | Phases of the second method in FIG. 12 |

The invention claimed is:

1. A method, comprising:
   transmitting a first offset corresponding to an OnDuration for monitoring at least one first downlink control channel using at least one first downlink beam of a beamformed transmission;
   determining that there is a need for changing from the at least one first downlink beam to at least one second downlink beam; and transmitting a first command to configure a receiver for monitoring the at least one first downlink control channel associated with the at least one second downlink beam according to a second offset corresponding to an OnDuration, wherein the first offset corresponding to an OnDuration comprises a first starting time, duration and periodicity for monitoring the at least one first downlink control channel and the second offset corresponding to an OnDuration comprises a second starting time, duration and periodicity for monitoring the at least one first downlink control channel, and wherein the first offset corresponding to an OnDuration is associated with a first TCI (Transmission Configuration Indication) state and the second offset corresponding to an OnDuration is associated with a second TCI state.

2. A method according to claim 1, wherein the second offset corresponding to an OnDuration is an adjustment of the first offset corresponding to an OnDuration.

3. A method according to claim 1, further comprising:
transmitting the first offset corresponding to an OnDuration using Radio Resource Control, RRC, signaling; and
transmitting the first command comprises using Media Access Control, MAC, signaling or Layer 1, L1, signaling.

4. A method according to claim 1,
transmitting a first control message using the at least one first downlink control channel according to the second offset corresponding to an OnDuration.

5. A method according to claim 1, wherein the first offset corresponding to an OnDuration comprises information related to a first Discontinuous Reception, DRX, configuration and the second offset corresponding to an OnDuration comprises information related to a second DRX configuration.

6. A method according to claim 1, wherein the first offset comprises first downlink control channel search space parameters and the second offset comprises second downlink control channel search space parameters.

7. A method according to claim 1, wherein the first and the second offsets are associated with a control resource set.

8. A method according to claim 1, wherein the first and the second offsets behaviour are associated with a downlink reference signal, such as a SS/PBCH block and/or NZP-CSI-RS.

9. A method according to claim 1, further comprising:
transmitting a second command for activating the second offset corresponding to an OnDuration for monitoring the at least one first downlink control channel associated with the at least one second downlink beam.

10. A method according to claim 9, wherein the first and the second commands are separate commands or a single command.

11. A method according to claim 1, wherein the first TCI state enables dynamic joint TX beam, search space and DRX configuration indication for a CORESET, the TCI state comprising values corresponding to possible values of a search space configuration for a CORESET and a SlotOffset value associated with DRX-SlotOffset reflecting a value range of active DRX configuration.

12. A method, comprising:
configuring a receiver for monitoring at least one first downlink control channel associated with at least one first downlink beam of a beamformed transmission according to a first offset corresponding to an OnDuration;

receiving a first command for changing from the at least one first downlink beam to at least one second downlink beam; and configuring, in response to receiving the first command, the receiver for monitoring the at least one first downlink control channel associated with the at least one second downlink beam according to a second offset corresponding to an OnDuration, wherein the first offset corresponding to an OnDuration comprises a first starting time, duration and periodicity for monitoring the at least one first downlink control channel and the second offset corresponding to an OnDuration comprises a second starting time, duration and periodicity for monitoring the at least one first downlink control channel, and wherein the first offset corresponding to an OnDuration is associated with a first TCI (Transmission Configuration Indication) state and the second offset corresponding to an OnDuration is associated with a second TCI state.

13. A method according to claim 12, wherein the second offset corresponding to an OnDuration is an adjustment of the first offset corresponding to an OnDuration.

14. A method according to claim 12, further comprising:
receiving the first offset corresponding to an OnDuration using RRC signaling; and
receiving the first command using MAC signalling or Layer 1, L1, signaling.

15. A method according to claim 12, further comprising:
receiving a first control message using the at least one first downlink control channel according to the second offset corresponding to an OnDuration.

16. A method according to claim 12, wherein the first offset corresponding to an OnDuration comprises information related to a first DRX configuration and the second offset corresponding to an OnDuration comprises information related to a second DRX configuration.

17. A method according to claim 12, wherein the first offset comprises first downlink control channel search space parameters and the second comprises second downlink control channel search space parameters.

18. A method according to claim 12, wherein the first and the second offsets are associated with a control resource set.

19. A method according to claim 12, wherein the first and the second offsets are associated with a downlink reference signal, such as a SS/PBCH block and/or NZP-CSI-RS.

20. A method according to claim 12, further comprising:
receiving a second command for activating the second offset corresponding to an OnDuration for monitoring the at least one first downlink control channel associated with the at least one second downlink beam.

21. A method according to claim 12, wherein the first and the second commands are separate commands or a single command.

22. A method according to claim 12, wherein the first TCI state enables dynamic joint TX beam, search space and DRX configuration indication for a CORESET, the TCI state comprising values corresponding to possible values of a search space configuration for a CORESET and a SlotOffset value associated with DRX-SlotOffset reflecting a value range of active DRX configuration.

23. An apparatus comprising at least one processing core, at least one memory including computer program code, the at least one memory and the computer program code being configured to, with the at least one processing core, cause the apparatus at least to perform:
configure a receiver for monitoring at least one first downlink control channel associated with at least one first downlink beam of a beamformed transmission according to a first offset corresponding to an OnDuration;

receive a first command for changing from the at least one first downlink beam to at least one second downlink beam; and configure, in response to receiving the first command, the receiver for monitoring the at least one first downlink control channel associated with the at least one second downlink beam according to a second offset corresponding to an OnDuration, wherein the first offset corresponding to an OnDuration comprises a first starting time, duration and periodicity for monitoring the at least one first downlink control channel and the second offset corresponding to an OnDuration comprises a second starting time, duration and periodicity for monitoring the at least one first downlink control channel, and wherein the first offset corresponding to an OnDuration is associated with a first TCI (Transmission Configuration Indication) state and the second offset corresponding to an OnDuration is associated with a second TCI state.

* * * * *